United States Patent
Ban et al.

(10) Patent No.: US 12,165,002 B2
(45) Date of Patent: Dec. 10, 2024

(54) AUGMENTED AIMER FOR SYMBOLOGY READERS

(71) Applicant: Hand Held Products, Inc., Fort Mill, SC (US)

(72) Inventors: Shankar Ban, Charlotte, NC (US); Benjamin Hejl, Charlotte, NC (US); Xiaofeng Xie, Charlotte, NC (US); David M. Wilz, Sr., Charlotte, NC (US); Erik Van Horn, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/309,248

(22) Filed: Apr. 28, 2023

(65) Prior Publication Data
US 2023/0367985 A1    Nov. 16, 2023

(30) Foreign Application Priority Data
May 12, 2022    (CN) .......................... 202210513355.5

(51) Int. Cl.
*G06K 7/14*    (2006.01)
*G06K 7/10*    (2006.01)
(Continued)

(52) U.S. Cl.
CPC ....... *G06K 7/1447* (2013.01); *G06K 7/10821* (2013.01); *G06T 11/60* (2013.01); *H04N 23/67* (2023.01)

(58) Field of Classification Search
CPC .. G06K 7/1447; G06K 7/10821; H04N 23/67; G06T 11/60
(Continued)

(56) References Cited

U.S. PATENT DOCUMENTS 8,678,282 B1    3/2014 Black et al.
9,202,094 B1    12/2015 Chen et al.
(Continued)

FOREIGN PATENT DOCUMENTS

EP    3299992 A1    3/2018

OTHER PUBLICATIONS

European search report Mailed on Sep. 27, 2023 for EP Application No. 23167277, 7 page(s).

*Primary Examiner* — Daniel A Hess
(74) *Attorney, Agent, or Firm* — Alston & Bird LLP

(57) ABSTRACT

Embodiments provide apparatuses, computer-implemented methods, and computer program products for generating an augmented aimer and using the augmented aimer to generate an augmented image. The augmented image is usable to aim a device, such as a reader, that captures image(s) for processing to detect and/or decode machine-readable symbologies therein. Some example embodiments include improved reader(s) configured to generate and/or utilize the augmented aimer. Some embodiments include receiving a first image captured by a first imager of at least one imager. Some embodiments further include generating, utilizing the first image, an augmented image comprising an augmented aimer corresponding to an optical center point associated with the first imager. Some embodiments further include causing rendering of the augmented image to at least one user interface. Some embodiments further include processing the first image to attempt reading of at least one machine-readable symbology in the first image.

20 Claims, 9 Drawing Sheets

(51) Int. Cl.
  *G06T 11/60*  (2006.01)
  *H04N 23/67*  (2023.01)
(58) Field of Classification Search
  USPC .......................................................... 235/454
  See application file for complete search history.

(56)          References Cited

U.S. PATENT DOCUMENTS 9,785,814  B1   10/2017  Todeschini
  10,108,832 B2   10/2018  Franz
  2003/0062413 A1  4/2003  Gardiner et al.
  2013/0293580 A1  11/2013 Spivack
  2014/0166761 A1  6/2014  Todeschini et al.
  2018/0089482 A1  3/2018  Todeschini

… … …

AUGMENTED AIMER FOR SYMBOLOGY READERS

CROSS-REFERENCE TO RELATED APPLICATIONS

This application claims priority pursuant to 35 U.S.C. 119(a) to Chinese Application No. 202210513355.5, filed May 12, 2022, which application is incorporated herein by reference in its entirety.

TECHNOLOGICAL FIELD

Embodiments of the present disclosure generally relate to digital scanners or readers of machine-readable symbologies (e.g., 1-D, 2-D, 3-D codes, and the like), and specifically to improved aiming implementations for such devices.

BACKGROUND

In several contexts, aiming of a reader utilized to "read" one or more code(s) is particularly important. Aiming of a reader ensures that the images captured by the reader are sufficiently targeted on a subject to be captured (e.g., the code(s)) so that the image(s) may be processed. In several contexts, for example as distance from the target to be read increases, aiming of a reader can be particularly difficult. In such contexts and/or other contexts, a physical aimer may be difficult or impossible to see by the user, or otherwise insufficient for use in aiming the reader itself.

Applicant has discovered problems with current implementations for aiming a reader. Through applied effort, ingenuity, and innovation, Applicant has solved many of these identified problems by developing solutions embodied in the present disclosure, which are described in detail below.

BRIEF SUMMARY

In one aspect, a computer-implemented method includes receiving a first image captured by a first imager of at least one imager, generating, utilizing the first image, an augmented image includes an augmented aimer corresponding to an optical center point associated with the first imager, causing rendering of the augmented image to at least one user interface, and processing the first image to attempt reading of at least one machine-readable symbology in the first image.

The computer-implemented method may also include where the first imager includes a far-field imager, and where the at least one imager includes the far-field imager and a near-field imager.

The computer-implemented method may also include the computer-implemented method further includes capturing the first image via the far-field imager of the at least one imager.

The computer-implemented method may also include where the first imager includes a far-field imager and where the at least one imager further includes a near-field imager, the computer-implemented method further includes capturing a plurality of additional images by cycling between capturing via at least the far-field imager and the near-field imager in accordance with a frame rate, receiving the plurality of additional images includes at least one first additional image captured by the far-field imager and at least one second additional image captured by the near-field imager, generating, for each additional image of the at least one first additional image captured by the far-field imager, an additional augmented image includes the augmented aimer, causing rendering of each additional augmented image to the at least one user interface, and processing each additional image of the at least one first additional image and the at least one second additional image to attempt reading of the at least one machine-readable symbology in each additional image.

The computer-implemented method may also include the computer-implemented method further includes receiving, in accordance with a frame rate, at least one additional image captured by the first imager of the at least one imager, generating, for each additional image of the at least one additional image, an additional augmented image includes the augmented aimer, causing rendering of each additional augmented image to the at least one user interface, and processing each additional image to attempt reading of the at least one machine-readable symbology in each additional image.

The computer-implemented method may also include where the first image is associated with a first focus, the computer-implemented method further includes configuring the first imager to capture an additional image associated with a second focus, receiving the additional image associated with the second focus, generating, utilizing the additional image, an additional augmented image includes the augmented aimer, causing rendering of the additional augmented image to the at least one user interface, and processing the additional image to attempt reading of the at least one machine-readable symbology in the first additional image.

The computer-implemented method may also include the computer-implemented method further includes detecting, via at least one photosensor or the at least one imager, an environmental aimer interference parameter value exceeds a threshold, and in response to determining the environmental aimer interference parameter value exceeds the threshold, deactivating a physical aimer.

The computer-implemented method may also include where processing the first image to attempt reading of the at least one machine-readable symbology in the first image includes processing the first image beginning from a center pixel associated with the augmented aimer.

The computer-implemented method may also include the computer-implemented method further includes setting at least one visual property of the augmented aimer based at least in part on configuration data associated with a physical aimer.

The computer-implemented method may also include the computer-implemented method further includes setting at least one visual property of the augmented aimer based at least in part on user input data representing a value for the at least one visual property.

The computer-implemented method may also include where the optical center point associated with the first imager is determined as a center point coordinate positioned at half of a width associated with the first image and half of a height associated with the first image.

The computer-implemented method may also include where each step is performed on a handheld mobile reader. Other technical features may be readily apparent to one skilled in the art from the following figures, descriptions, and claims.

In one aspect, an apparatus is provided. In some embodiments the apparatus includes means for performing any of the example computer-implemented methods described herein. In one example embodiment the apparatus includes at least one imager. The apparatus also includes a processor. The apparatus also includes a memory storing instructions that, when executed by the processor, cause the apparatus to receive a first image captured by a first imager of the at least one imager, generate, utilizing the first image, an augmented image includes an augmented aimer corresponding to an optical center point associated with the first imager, cause rendering of the augmented image to at least one user interface, and process the first image to attempt reading of at least one machine-readable symbology in the first image.

The apparatus may also include where the first imager includes a far-field imager and where the at least one imager further includes a near-field imager, the apparatus further caused to capture a plurality of additional images by cycling between capturing via at least the far-field imager and the near-field imager in accordance with a frame rate, receive the plurality of additional images includes at least one first additional image captured by the far-field imager and at least one second additional image captured by the near-field imager, generate, for each additional image of the at least one first additional image captured by the far-field imager, an additional augmented image includes the augmented aimer, cause rendering of each additional augmented image to the at least one user interface, and process each additional image of the at least one first additional image and the at least one second additional image to attempt reading of the at least one machine-readable symbology in each additional image.

The apparatus may also include a physical aimer, and the apparatus further caused to detect, via at least one photosensor or the at least one imager, an environmental aimer interference parameter value exceeds a threshold, and in response to determining the environmental aimer interference parameter value exceeds the threshold, deactivate the physical aimer.

The apparatus may also include where to process the first image to attempt reading of the at least one machine-readable symbology in the first image, the apparatus is caused to process the first image beginning from a center pixel associated with the augmented aimer. Other technical features may be readily apparent to one skilled in the art from the following figures, descriptions, and claims.

In one aspect, a non-transitory computer-readable storage medium, is provided. In some embodiments the computer-readable storage medium is configured for performing any of the example computer-implemented methods described herein. In one example embodiment the computer-readable storage medium is provided including instructions that when executed by at least one processor, cause the at least one processor to receive a first image captured by a first imager of at least one imager, generate, utilizing the first image, an augmented image includes an augmented aimer corresponding to an optical center point associated with the first imager, cause rendering of the augmented image to at least one user interface, and process the first image to attempt reading of at least one machine-readable symbology in the first image.

The non-transitory computer-readable storage medium may also include where the first imager includes a far-field imager and where the at least one imager further includes a near-field imager, the at least one processor further configured to capture a plurality of additional images by cycling between capturing via at least the far-field imager and the near-field imager in accordance with a frame rate, receive the plurality of additional images includes at least one first additional image captured by the far-field imager and at least one second additional image captured by the near-field imager, generate, for each additional image of the at least one first additional image captured by the far-field imager, an additional augmented image includes the augmented aimer, cause rendering of each additional augmented image to the at least one user interface, and process each additional image of the at least one first additional image and the at least one second additional image to attempt reading of the at least one machine-readable symbology in each additional image.

The non-transitory computer-readable storage medium may also be further configured to detect, via at least one photosensor or the at least one imager, an environmental aimer interference parameter value exceeds a threshold, and in response to determining the environmental aimer interference parameter value exceeds the threshold, deactivate a physical aimer. Other technical features may be readily apparent to one skilled in the art from the following figures, descriptions, and claims.

The computer-implemented method may also be configured to successfully detect the at least one machine-readable symbology in a final additional image of the at least one additional image. Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
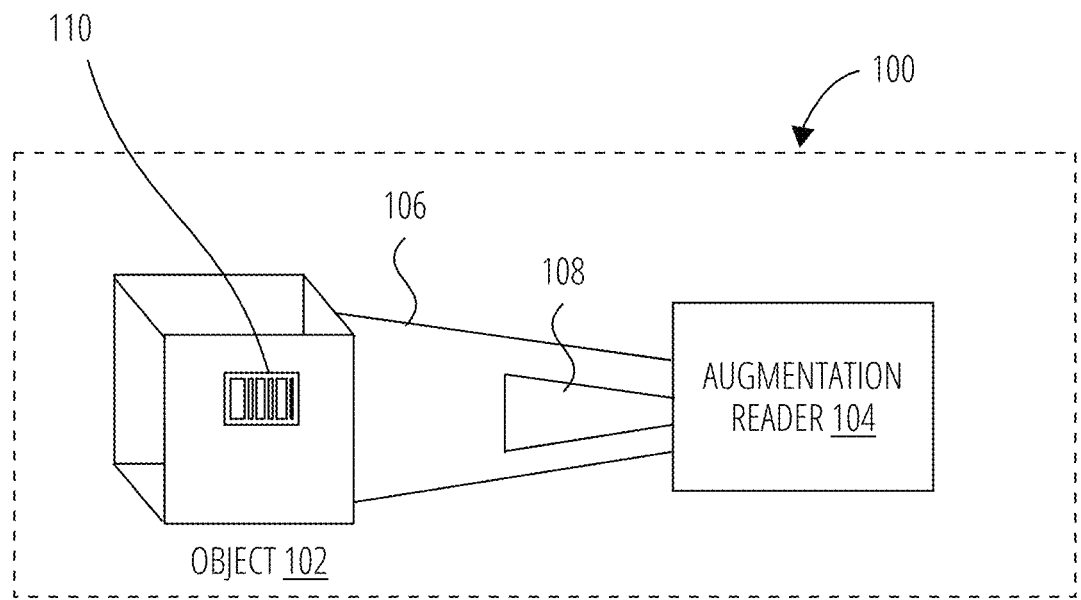
FIG. 1 illustrates an environment for scanning using an example improved reader in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Aiming of a reader (e.g., a barcode scanner or any other device capable of detecting and/or decoding machine-readable symbologies) remains an important task to enable successful processing of machine readable symbology/symbologies. For example, a reader may need to be in sufficient alignment with a machine-readable symbology to ensure that the machine-readable symbology captures an image representing the machine-readable symbology in a sufficient manner to enable detection and/or decoding of the machine-readable symbology. In circumstances where a reader is misaligned with a particular machine-readable symbology, the reader may capture an image that cannot sufficiently be processed, for example where the image does not include the machine-readable symbology (e.g., the machine-readable symbology is out of frame) in whole or in part, represents the machine-readable symbology in a manner unable to be detected and/or decoded (e.g., at an angle not processable using image processing), and/or the like.

To assist in properly aiming the reader, such reader(s) often include a physical aimer. The physical aimer projects an aimer illumination into at least one field of view capturable by at least one imager. In this regard, the aimer illumination may be projected onto an object in the field of view(s) so that the reader can be moved, rotated, and/or otherwise reoriented based on the aimer illumination. For example, in some contexts a user may rotate or move a reader to reposition an aimer near or onto a machine-readable symbology into the field of view of the reader.

The inventors determined that in various contexts, the physical aimer suffers from many deficiencies. In a context where the reader is positioned far from a machine-readable symbology, for example, the aimer illumination produced by the aimer may be difficult for a user (e.g., an operator of the reader) often will not reach the object upon which the aimer illumination is to be projected. Similarly, in a context where the reader is in a significantly bright environment, for example, the aimer illumination produced by the aimer may overwhelmed by external or specular light impacting the object. In this regard, the aimer illumination may similarly not be visible on the object. Regardless of the reason, in a circumstance where the aimer illumination is not visible on the object, it may be difficult or impossible for an operator of the reader to properly position and/or align the reader to enable capturing of an image representation of a machine-readable symbology that is successfully processable (e.g., to detect and decode a machine-readable symbology represented in the captured image).

Embodiments of the present disclosure provide for use of an augmented aimer. In some embodiments, an augmented aimer is generated that is renderable within a captured image of an environment. In this regard, the augmented aimer may be rendered as a virtual interface element at a particular position, for example corresponding to a central point of a field of view. In some embodiments, the augmented aimer is utilized to augment a captured image by a particular imager of the reader. For example, in some embodiments, the augmented aimer is utilized to generate an augmented aimer that includes a representation of a generated augmented aimer by augmenting an image captured by a particular imager of a multi-imager reader that is intended for longer range image processing (e.g., a far-field imager). The augmented image is outputtable, for example by rendering to one or more user interface(s), such that an operator may view the captured image representing the field of view of the particular imager in conjunction with the augmented aimer indicating a central point or central axis of the field of view. In this regard, even in circumstances where a reader is positioned at a far distance from an object to be read, the augmented image nevertheless is renderable for use by an operator in adjusting the position and/or orientation of the reader to better align the reader with one or more machine-readable symbologies to be read.

Embodiments utilizing an augmented aimer provide a myriad of advantages. For example, by accurately depicting an augmented aimer in an augmented image, some embodiments of the present disclosure accurately depict a central point or axis of a capturable field of view in a manner that cannot be degraded due to environmental effects (e.g., brightness, quality of the physical aimer, distance, and/or the like). Additionally or alternatively, some embodiments enable the augmented aimer to be depicted clearly on an object regardless of the distance between a device and the object. Additionally or alternatively still, some embodiments enable the augmented aimer to be consistently rendered as a device (e.g., a reader having imagers for capturing one or more field(s) of view) is moved, such that the operator of the device may reposition the device based on the depiction of the augmented aimer in the captured environment, the relation between the augmented aimer and a representation of a machine-readable symbology in the captured image, and/or the like. Some embodiments utilize a particular imager, for example a far-field imager associated with a further focal distance, higher resolution, and/or narrower field of view, to enable an operator to specifically reposition the device in circumstances where a machine-readable symbology to be scanned is past a particular distance from the reader. In some embodiments, an augmented aimer is utilized to augment images captured by a plurality of imagers, such that the augmented aimer may be utilized to control the device at any range from a machine-readable symbology.

In some embodiments, the augmented aimer provides additional technical advantages in operating a particular device that captures image(s) representing an environment, generates aimer illumination(s), and/or the like (e.g., a reader). Some embodiments utilize the augmented aimer to indicate a beginning position from which an image is to be processed, for example for purposes of attempting to detect and decode at least one machine-readable symbology represented therein. Additionally or alternatively, some embodiments render an augmented aimer in place of an aimer illumination produced by a physical aimer, for example in all circumstances or in instances where it is determined that an aimer illumination may not be visible (e.g., due to environmental effects, distance, and/or the like). Such embodiments reduce power consumption and computing resource expenditure by preventing resources from being wasted on activation of a physical aimer. Additionally or alternatively, some embodiments enable visual configuration of an augmented aimer to enable visibility of the augmented aimer in a desired context or a plurality of contexts, and/or fit the augmented aimer in accordance with a physical aimer of a particular device (e.g., a reader). In this regard, the augmented aimer may be readily presented (automatically or after user configuration) with consistency, without requiring additional operator training and/or expertise, and/or without disturbing an operator's conventional workflow.

Definitions

"Augmented aimer" refers to virtual data superimposed or otherwise inserted into an image representation of a real-world environment, where the virtual data represents a virtual version of an aimer in alignment or near-alignment with a center of a capturable field of view.

"Augmented image" refers to an image augmented to include one or more virtual element(s). In some embodiments, an augmented image includes a representation of a real-world environment augmented to include an augmented aimer.

"Center pixel" refers to a pixel representing a center of a field of view.

"Center point coordinate" refers to a position representation of a center of a field of view. In some embodiments, a center point coordinate includes an x-coordinate and a y-coordinate. In some embodiments the center point coordinate corresponds to a center pixel.

"Configuration data" refers to electronically-managed data that represents one or more parameter(s) associated with operation of a device.

"Environmental aimer interference parameter" refers to an electronically determinable parameter that impacts the visibility of a physical aimer light in a real-world environment. Non-limiting examples of an environmental aimer interference parameter include a brightness parameter, an exposure parameter, and an intensity parameter.

"Environmental aimer interference parameter value" refers to electronically managed data representing a value corresponding to a parameter associated with a visual representation of a real-world environment. Non-limiting examples of an environment aimer interference parameter "Far-field imager" refers to an imager configured to capture image(s) at a further focal range than one or more other imager(s) of a device. In some embodiments, a far-field imager is in focus at a range of 50-75 feet.

"Focus" refers to a focal range and/or distance at which an imager captures a clear image.

"Image" refers to electronically managed data representing light captured by an image sensor.

"Imager" refers to refers to an image sensor coupled with one or more optical component(s) that enable capture of a particular field of view at a particular focus.

"Machine-readable symbology" refers to a visual code or other representation that encodes particular data, and is electronically detectable and decodable to read said data. In some embodiments, a machine-readable symbology is readable to determine the data encoded by the machine-readable symbology. Non-limiting examples of a machine-readable symbology include a one-dimensional barcode, a two-dimensional barcode, a three-dimensional barcode, a QR code, an encoded image, a text character, a custom identifiable object detectable via a custom algorithm, and a custom detectable image.

"Near-field imager" refers to an imager configured to capture image(s) at a nearer focal range than one or more other imager(s) of a device. In some embodiments, a near-field imager is in focus at a range of under 1 feet.

"Optical center point" refers to a coordinate point central to an image captured by a particular imager. The central axis, in some embodiments, is an optical center point that represents central point aligned with a central axis of a field of view capturable by the imager. In some embodiments, an optical center point represents central point aligned with a central axis aligned with an aimer illumination produced by an aimer of a device.

"Physical aimer" refers to one or more electronic device(s) and/or component(s) that project an illumination representing an illumination pattern into a real-world environment.

"Reader" refers to one or more computing device(s) embodied in hardware, software, firmware, and/or a combination thereof, that is configured to capture image(s) representing a real-world environment and process the captured image(s) to attempt to detect and decode a machine-readable symbology/machine readable symbologies therein.

"Reading" refers to one or more electronically-driven algorithmic process(es) that detect at least one machine-readable symbology in a captured image, and/or decode a detected at least one machine-readable symbology.

"User interface" refers to a rendered representation of data utilizing hardware, software, firmware, and/or a combination thereof. Non-limiting examples of a user interface include a software renderable interface that is renderable to a display of a computing device, and that includes any number of individual control(s), image(s), and/or other visual element(s).

"Visual property" refers to electronically managed data representing any parameter, determinable in whole or in part via software, that affects the visual look of any element rendered to a user interface.

Example Systems and Apparatuses of the Disclosure

FIG. 1 illustrates an environment for scanning using an example improved reader in accordance with at least some example embodiments of the present disclosure. Specifically, FIG. 1 illustrates an example environment 100 in which an augmentation reader 104 is utilized to attempt detecting and decoding of a machine-readable symbology, specifically machine-readable symbology 110. The machine-readable symbology 110 in some embodiments encodes data, such that successful detection and decoding of the machine-readable symbology 110 is usable to retrieve the data encoded thereby. Non-limiting examples of the machine-readable symbology 110 include any one-dimensional, two-dimensional, and/or three-dimensional machine-readable code(s), including and without limitation a barcode, QR Code, Data Matrix, encoded image, and/or the like, which may or may not be visibly distinguishable by a human but is detectable and decodable by one or more computing device(s), as described further herein. The machine-readable symbology 110 is depicted as part of a marking, label, or otherwise affixed to or a part of the object 102. It will be appreciated that in some embodiments, the machine-readable symbology 110 is embodies as a mark, label, or otherwise associated with or affixed to an object with which it is associated, such as the object 102. In some such embodiments, the machine-readable symbology 110 encodes or otherwise represents data value(s) associated with the object 102. In other embodiments, the machine-readable symbology 110 is separate from any such object and/or data with which it is associated. Additionally or alternatively, it will be appreciated that the object 102 may be any shape, size, and/or type of object. For brevity and clarity of the description and figures, the object 102 is depicted as a rectangular prism and the machine-readable symbology 110 is depicted as a barcode, however in other embodiments the object 102 may be any other type of object and/or the machine-readable symbology 110 may be any other type of machine-readable symbology.

The augmentation reader 104 includes one or more computing device(s) that captures at least one field of view. In some embodiments, the augmentation reader 104 embodies a mounted or hand-held reader of machine-readable symbology/symbologies, for example a barcode scanner or the like. In some embodiments, the augmentation reader 104 includes at least one imager, each defining a particular field of view capturable utilizing an image sensor and associated optical component(s). In some embodiments, for example as illustrated, the augmentation reader 104 includes two imagers each configured to capture a different field of view, for example far field of view 106 and near field of view 108. It will be appreciated that in other embodiments, the augmentation reader 104 includes imagers for capturing a different number of fields. For example, in some embodiments the augmentation reader 104 captures a single field of view. In some other embodiments, the augmentation reader 104 includes a plurality of imagers for capturing two fields of view, three fields of view, or more. In some embodiments, the augmentation reader 104 includes illuminators that produce illuminations for brightening the fields of view capturable by the augmentation reader 104.

The near field of view 108 in some embodiments is associated with a first focus, for example defined by a first focal range at a first distance from the augmentation reader 104. Similarly, the far field of view 106 in some embodiments is associated with a second focus, for example defined by a second focal range at a second distance from the augmentation reader 104 that is further than the first distance associated with the near field of view 108. In this regard, the imager associated with the near field of view 108 may capture a clearer image in a circumstance where a subject to be imaged is closer to the augmentation reader 104, whereas the far field of view 106 may capture a clearer image in a circumstance where the subject is further from the augmentation reader 104 (e.g., past the visual depiction of near field of view 108 in FIG. 1). In this regard, the imager associated with near field of view 108 may embody a near field imager focused at a few inches or feet, whereas the imager associated with far field of view 106 may embody a far field imager focused at several feet or yards, and/or that maintains a clearer focus at further distances.

In some embodiments the augmentation reader 104 embodies a reader affixed at a particular point. In this regard, the augmentation reader 104 may be utilized to capture images of an environment for purposes of detecting and/or decoding machine-readable symbologies captured therein from its fixed position. It will be appreciated that augmentation reader 104 may rotate or otherwise change orientation in a circumstance where the augmentation reader 104 is located at a fixed position. In some such contexts, it will be appreciated that the distance between the augmentation reader 104 and a machine-readable symbology may differ as such machine-readable symbologies enter or otherwise are within the field(s) of view capturable by the augmentation reader 104.

In some embodiments, the augmentation reader 104 embodies a handheld and/or mobile reader. In this regard, a user (not depicted) may carry the augmentation reader 104 and orient it to capture images of the environment 100 for purposes of processing such images, for example to detect and/or decode machine-readable symbology/symbologies therein. In some such contexts, it will be appreciated that a user may position the augmentation reader 104 at different distances from one or more machine readable machine-readable symbologies to be read, for example on the object 102, during operation of the augmentation reader 104.

It will be appreciated that the augmentation reader 104 may be configured to perform any number of functions. In some embodiments, the augmentation reader 104 only captures images representing one or more field(s) of view. In some such embodiments, the augmentation reader 104 transmits the captured image(s) to one or more associated external computing device(s) that stores and/or processes the captured image(s) for one or more purposes, such as a backend server, a linked client computing device (e.g., a smart phone), and/or the like that processes captured image(s) to attempt to detect and/or decode machine-readable symbologies therein. The augmentation reader 104 may be communicable with an external computing device via one or more communications network(s), for example a wireless Bluetooth link, Wi-Fi, cellular communication link, and/or the like, or via a wired connection interface with the external computing device. In some embodiments, the augmentation reader 104 captures images and processes the captured images onboard the augmentation reader 104. In either such circumstances, in some embodiments, the augmentation reader 104 includes or is associated with a display that enables rendering of a user interface comprising a captured image and/or an augmented image associated therewith.

In some embodiments, one or more of the fields of view capturable by the augmentation reader 104 are aligned or near-aligned (e.g., within a threshold acceptable offset) to a shared axis. Additionally or alternatively, in some embodiments, the augmentation reader 104 includes a physical aimer that produces an aimer illumination towards the field(s) of view. In this regard, the aimer illumination may be positioned along the central axis of the field(s) of view, such that alignment of the aimer illumination enables alignment of the field(s) of view capturable by the augmentation reader 104. Additionally or alternatively, in some embodiments, the augmentation reader 104 (alone or in communication with an external computing device) generates and/or renders a user interface including an augmented image depicting an augmented aimer. The augmented aimer may be visible regardless of the distance at which the augmentation reader 104 is positioned from the subject to be imaged, as described further herein.

In some embodiments, the augmentation reader 104 is configurable such that a user may select one or more particular modes of operation, adjust one or more settings, and/or the like. For example, in some embodiments, the augmentation reader 104 is configurable to enable a user to toggle between at least a first mode that utilizes an augmented aimer, and a second mode that does not utilize an augmented aimer. Alternatively or additionally, in some embodiments, the augmentation reader 104 enables configuration of a mode that utilizes a physical aimer and an augmented aimer, a mode that utilizes just an augmented aimer, and/or a mode that utilizes just a physical aimer, and/or any combination of modes thereof. It will be appreciated that in this regard, the augmentation reader 104 may be embodied in any of a myriad of manners to allow for customizability between use of an augmented aimer and use of a physical aimer or no aimer at all.

In some embodiments, the augmentation reader 104 is communicatively coupled with an external device. In some embodiments, the augmentation reader 104 is coupled with an external user device that provides input and/or output functionality associated with the augmentation reader 104.

For example, in some embodiments, the augmentation reader 104 captures images for output via user interface(s) rendered via the external, coupled companion device (e.g., a user's smart phone linked via Bluetooth or another connection). Additionally or alternatively, in some embodiments, the external device is utilized to control one or more aspects of the augmentation reader 104. For example, in some embodiments, an external device is utilized to reposition, move, or otherwise manipulate the orientation and/or position of the augmentation reader 104 (e.g., by transmitting control commands to the augmentation reader 104 from the external device). Additionally or alternatively, in some embodiments, the external device is utilized to configure one or more setting(s) of the augmentation reader 104.

Figure 2:
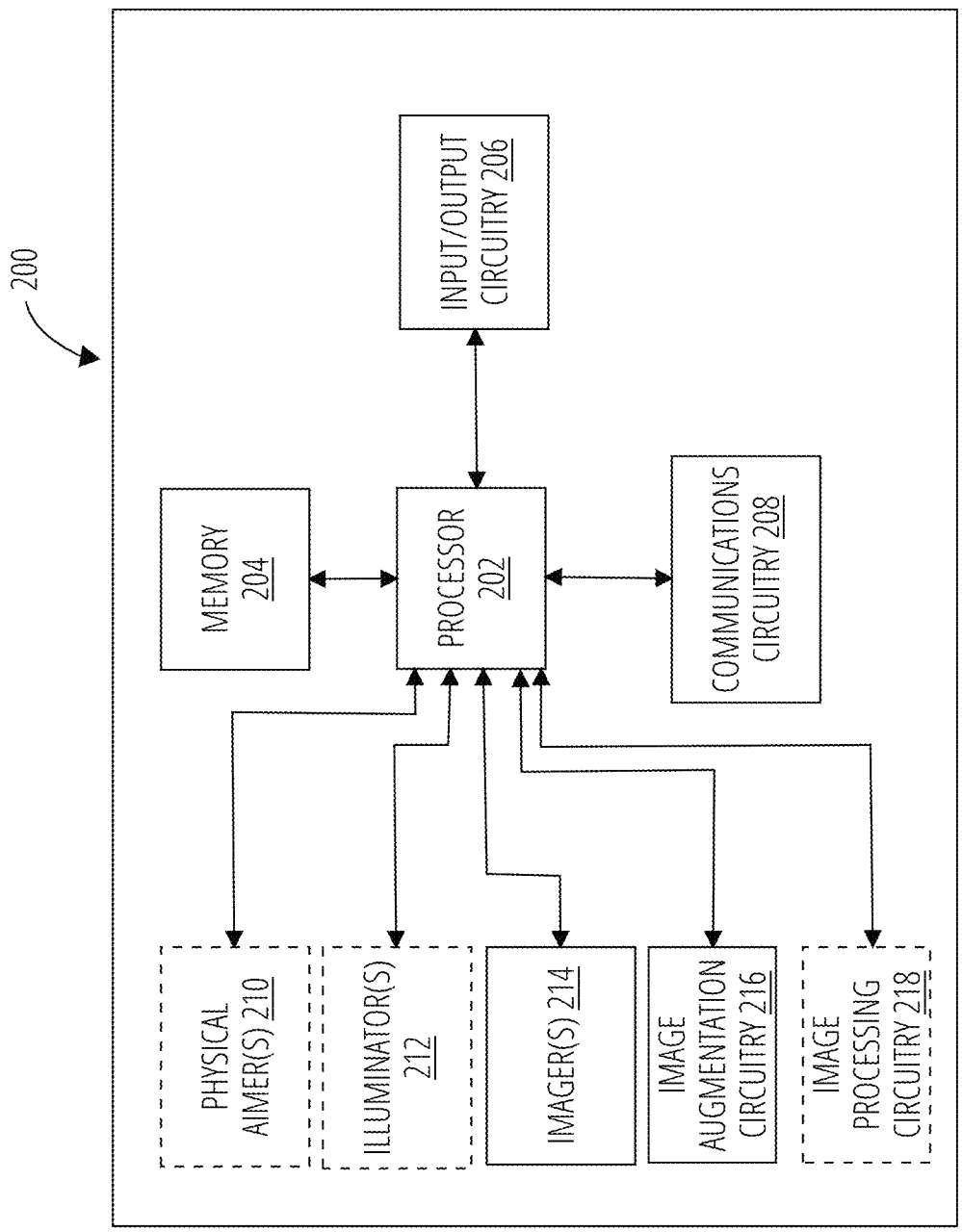
FIG. 2 illustrates a block diagram of an example apparatus in accordance with at least some example embodiments of the present disclosure.

FIG. 2 illustrates a block diagram of an example apparatus in accordance with at least some example embodiments of the present disclosure. In some embodiments, the augmentation reader 104 is embodied by one or more computing device(s), such as the apparatus 200 as depicted and described in FIG. 2. The apparatus 200 includes processor 202 memory 204, input/output circuitry 206, communications circuitry 208, physical aimer(s) 210, illuminator(s) 212, imager(s) 214, image augmentation circuitry 216, and image processing circuitry 218. In some embodiments, the apparatus 200 is configured, using one or more of the sets of circuitry 202, 204, 206, 208, 210, 212, 214, 216, and/or 218, to execute the operations of the various functionality described with respect to the augmentation reader 104 and further herein. In some embodiments, one or more of the circuitry portions are embodied in an external device communicable with the apparatus 200. For example, in some embodiments, the apparatus 200 captures images and displays generated augmented image(s). In some other embodiments, the apparatus 200 receives captured images, generates augmented images, and causes rendering of the augmented images to at least one display.

Although components are described with respect to functional limitations, it should be understood that the particular implementations necessarily include the use of particular computing hardware. It should also be understood that in some embodiments, certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to the components of the apparatus(es) described herein should therefore be understood to include particular hardware configured, for example via software and/or firmware, to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of other particular sets of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry and/or external device(s), and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with image capture and/or augmentation to output an augmented image, for example as described with respect to operation of the augmentation reader 104 and/or as described further herein. In some embodiments, the processor 202 includes hardware, software, firmware, and/or a combination thereof, that controls activation of one or more image sensor(s) to capture image(s) utilizing the image sensor(s). Additionally or alternatively, in some embodiments, the processor 202 includes hardware, software, firmware, and/or the like, that controls activation of one or more other component(s) of the apparatus 200, for example a physical aimer thereof. Additionally or alternatively, in some embodiments, the processor 202 includes hardware, software, firmware, and/or the like, that configures and/or generates an augmented aimer. Additionally or alternatively, in some embodiments, the processor 202 includes hardware, software, firmware, and/or the like, that generates an augmented image based at least in part on a captured image and/or augmented aimer. Additionally or alternatively, in some embodiments, the processor 202 includes hardware, software, firmware, and/or the like, that causes rendering of an augmented image. Additionally or alternatively, in some embodiments, the processor 202 includes hardware, software, firmware, and/or the like, that processes one or more image(s) to attempt detection and/or decoding of one or more machine-readable symbologies therein.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display or plurality of displays that comprise(s) the interface(s) rendered as a web user interface, an application user interface, an external user device, a backend system, or the like. In some embodiments, the input/output circuitry 206 also includes a trigger, keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments, the input/output circuitry 206 includes a display integrated into the chassis of the apparatus 200.

The communications circuitry 208 includes any means such as a device or circuitry embodied in either hardware or a combination of hardware and software that is configured to receive and/or transmit data from/to a network and/or any other device, circuitry, or module that is part of or in communication with the apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the apparatus 200.

The optional physical aimer(s) 210 includes hardware, software, firmware, and/or a combination thereof, that produce at least one aimer illumination into an environment. In some embodiments, the physical aimer(s) 210 includes at least one LED, laser, or other light producing component. Additionally or alternatively, in some embodiments, the physical aimer(s) 210 includes optical lens(es), diffractor(s), reflector(s), and/or other components for producing or manipulating light utilized to produce an aimer illumination. Additionally or alternatively, in some embodiments, the physical aimer(s) 210 includes pattern generating optical elements that manipulate light to be of a particular pattern, shape, and/or the like. Additionally or alternatively, in some embodiments, the physical aimer(s) 210 includes hardware, software, firmware, and/or a combination thereof, that controls activation of the light producing component(s) associated with generating an aimer illumination. In some embodiments, the apparatus 200 does not include any physical aimer, for example where only an augmented aimer is utilized as described further herein.

The optional illuminator(s) 212 includes hardware, software, firmware, and/or a combination thereof, that produces one or more illumination(s) intended to illuminate field(s) of view capturable by the apparatus 200. In some embodiments, the illuminator(s) 212 includes at least one illuminator. Each illuminator of the illuminator(s) 212 include, in some embodiments, at least one LED, laser, or other light producing component. Additionally or alternatively, in some embodiments, the illuminator(s) 212 includes optical lens(es), diffractor(s), reflector(s), and/or other components for producing and/or manipulating light utilized to illuminate at least one field of view in a particular manner. Additionally or alternatively, in some embodiments, the illuminator(s) 212 includes hardware, software, firmware, and/or a combination thereof, that controls activation of the light producing component(s) associated with generating such illumination(s). In some embodiments, the apparatus 200 does not include any illuminator.

The imager(s) 214 includes hardware, software, firmware, and/or a combination thereof, that capture(s) an image representing a particular field of view. In some embodiments, each imager of the imager(s) 214 includes an image sensor that utilizes light incident on or otherwise impacting the image sensor to generate data embodying a captured image. Additionally or alternatively, in some embodiments, the imager(s) 214 include optical lens(es), reflector(s), and/or other component(s) that define the field(s) of view capturable by one or more corresponding image sensor(s). In this regard, an imager of the imager(s) 214 may be activated to capture an image representation of the field of view that is visible to said imager, as defined by the image sensor and corresponding optical element(s). In some embodiments, the apparatus 200 includes a single imager. In some embodiments, the apparatus 200 includes a plurality of imagers, for example at least a near-field imager and a far-field imager associated with a corresponding near field of view and a far field of view.

In some embodiments, the image augmentation circuitry 216 includes hardware, software, firmware, and/or a combination thereof, for performing functionality associated with configuration, generation of, and/or use of an augmented aimer. For example, in some embodiments, the image augmentation circuitry 216 includes hardware, software, firmware, and/or a combination thereof, that receives a captured image. Additionally or alternatively, in some embodiments, the image augmentation circuitry 216 includes hardware, software, firmware, and/or a combination thereof, that configures an augmented aimer to be generated by the apparatus 200. Additionally or alternatively, in some embodiments, the image augmentation circuitry 216 includes hardware, software, firmware, and/or a combination thereof, that generates an augmented image including an augmented aimer. In some embodiments, the image augmentation circuitry 216 includes hardware, software, firmware, and/or a combination thereof, that generates an augmented image from a captured image and a generated augmented aimer. Additionally or alternatively, in some embodiments, the image augmentation circuitry 216 includes hardware, software, firmware, and/or a combination thereof, that causes rendering of a user interface including an augmented image, the augmented image including at least an augmented aimer. Additionally or alternatively, in some embodiments, the image augmentation circuitry 216 includes hardware, software, firmware, and/or a combination thereof, that controls activation of a physical aimer, for example such that the physical aimer may be disabled or otherwise not activated in particular circumstances, as described further herein. It will be appreciated that, in some embodiments, image augmentation circuitry 216 may include a separate processor, specially configured field programmable gate array (FPGA), or a specially programmed application specific integrated circuit (ASIC).

In some embodiments, the image processing circuitry 218 includes hardware, software, firmware, and/or a combination thereof, for performing functionality associated with processing one or more image(s) to detect and/or decode at least one machine-readable symbology therein. For example, in some embodiments, the image processing circuitry 218 includes hardware, software, firmware, and/or a combination thereof, that receives data object(s) embodying image(s) captured via one or more image sensor(s). Additionally or alternatively, in some embodiments, the image processing circuitry 218 includes hardware, software, firmware, and/or a combination thereof, that processes an image to detect at least one machine-readable symbology within the image. Additionally or alternatively, in some embodiments, the image processing circuitry 218 includes hardware, software, firmware, and/or a combination thereof, that processes each machine-readable symbology of at least one machine-readable symbology detected in at least one captured image. For example, in some embodiments the image processing circuitry 218 decodes a single detected machine-readable symbology, or all detected machine-readable symbologies. Additionally or alternatively, in some embodiments, the image processing circuitry 218 includes hardware, software, firmware, and/or a combination thereof, that stores and/or transmits data decoded from a machine-readable symbology/machine-readable symbologies. It will be appreciated that, in some embodiments, image processing circuitry 218 may include a separate processor, specially configured field programmable gate array (FPGA), or a specially programmed application specific integrated circuit (ASIC).

In some embodiments, one or more of the sets of circuitries 202-218 are combinable. Alternatively or additionally, in some embodiments, one or more of the sets of circuitry perform some or all of the functionality described associated with another component. For example, in some embodiments, one or more of the sets of circuitry 202-218 are combined into a single module embodied in hardware, software, firmware, and/or a combination thereof. Similarly, in some embodiments, one or more of the sets of circuitry, for example, image augmentation circuitry 216 and/or image processing circuitry 218 is/are combined such that the processor 202 performs one or more of the operations described above with respect to each of these sets of circuitry.

Example Augmented Aimer Configuration and Image Augmentation

Having described example environments, systems, and apparatuses in accordance with the present disclosure, example augmented aimer implementations and augmented images will now be described. It will be appreciated that the example augmented aimers and augmented images depicted herein are exemplary. In other embodiments, the augmented aimer may include any of a number of alternative visual properties (e.g., color, shape, size, and/or the like). Similarly, the depicted interfaces for configuring the augmented aimer are exemplary, and in other embodiments such user interface(s) may include different control(s), alter different visual properties of the augmented aimer, and/or the like. Accordingly, the particular image(s) and user interface(s) should not limit the scope and spirit of this disclosure or the claims amended herein.

Figure 3:
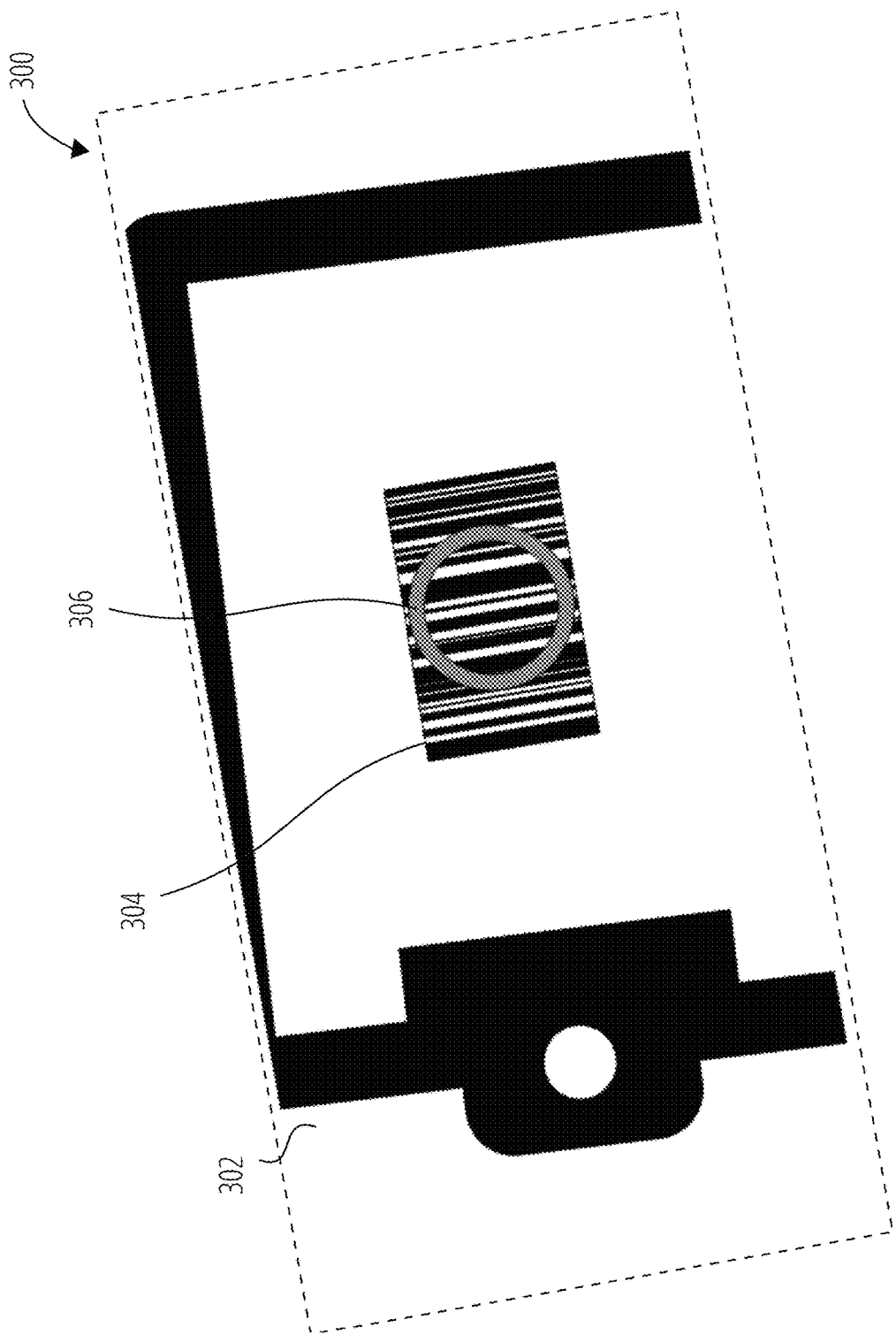
FIG. 3 illustrates an example augmented image including an augmented aimer in accordance with at least some example embodiments of the present disclosure.

FIG. 3 illustrates an example augmented image including an augmented aimer in accordance with at least some example embodiments of the present disclosure. Specifically, FIG. 3 depicts an augmented image 300. In some embodiments, the augmented image 300 is renderable to at least one user interface. For example, the augmented image 300 may be rendered to a user interface depicted on a display of a reader or other apparatus, such as the apparatus 200 as depicted and described herein. In other embodiments, the augmented image 300 is generated and transmitted to an external computing device for rendering.

In some embodiments the augmented image 300 is generated from a captured image of a particular field of view. For example, in some embodiments the apparatus 200 receives the image 302 as captured from an image sensor on or communicable with the apparatus 200. In some such embodiments, the image 302 may be generated by "capturing" light incident on said image sensor and generating the corresponding data signals associated therewith, such that the image sensor thereby produces an accurate representation of the captured field of view based on the light incident to the image sensor. Any of a myriad of known image sensors may be utilized to capture the image 302.

In this regard, the captured image is utilized as a base image representing a particular portion of an environment that is within the capturable field of view. As depicted, the augmented image 300 includes an image 302 that depicts a particular captured representation of the environment. The image 302 may include a myriad of separate image portions, for example with portion(s) of the image 302 representing a machine-readable symbology or multiple machine-readable symbologies, and other portion(s) of the image 302 representing merely environmental or other data not relevant for a particular image processing task to be performed. It will be appreciated that an image, such as the image 302, may include representations of any number of machine-readable symbologies. As illustrated, the image 302 includes a representation of a machine-readable symbology, specifically machine-readable symbology 304.

In some embodiments, the augmented image 300 is generated (e.g., by the apparatus 200) by augmenting the captured image, such as the image 302 with virtual data. For example, in some embodiments an image is augmented to include an augmented aimer, for example the augmented aimer 306. In some embodiments, the augmented aimer is configured based at least in part on particular configuration data, for example that is set manually in response to user input and/or automatically, as described herein. Non-limiting examples of such configuration data includes data that indicates a shape, size, image, color, and/or value for any other visual property associated with the augmented aimer 306. As illustrated, the augmented aimer 306 is generated as a green circle with a particular defined radius and thickness.

In some embodiments, the augmented aimer 306 embodies data utilized to augment at least a portion of the image 302 to indicate a center axis of the field of view as represented in the image 302. For example, in some embodiments, the augmented aimer 306 is utilized to augment data at or near to a center pixel associated with the image 302. As illustrated, for example, the augmented aimer 306 may be utilized to update particular data (e.g., pixels of the image 302) at the radius from a center pixel determined as halfway between the width and the height of the image 302 (e.g., an intersection of the planes that divides the image in half with reference to the width and the height of the image). In some embodiments, the apparatus 200 augments the image 302 by overwriting one or more portion(s) of data with data corresponding to a portion of the augmented aimer 306. In some such embodiments, the apparatus 200 augments the image 302 by superimposing the augmented aimer 306 onto the image 302 at a defined position (e.g., centered on a center pixel of the image 302).

It will be appreciated that in some embodiments, the image 302 represents a far field image representing a captured far field of view. In some embodiments, the far field of view is focused at a much greater distance than one or more other imager(s) of the apparatus 200, and may be focused at a distance greater than the human eye of a corresponding user. In this regard, the image 302 may represent a view of an environment that is magnified as compared to the eye of a human operator, thus giving a better view of object(s) in the environment at a further distance (e.g., several feet away, tens of feet away, and/or the like). The augmented aimer 306 indicates an optical center point of the captured field of view. In this regard, the optical center point of the field of view represents a position in the environment that is centrally located to an image sensor that captures the field of view. As such, a user may utilize the position of the augmented aimer 306 in conjunction with the environment depicted in the image 302 of the augmented image 300 to determine whether the device utilized for capturing said image(s) (e.g., the apparatus 200) is well-oriented with a target subject. For example, in a circumstance where a user intends to capture a readable image of the machine-readable symbology 304 via the apparatus 200, a user may utilize the augmented image 300 to determine how to manipulate the apparatus 200 to better capture a representation of the machine-readable symbology 304 based on the position of the augmented aimer 306 with the representation of the machine-readable symbology 304. In some embodiments, the image 302 is captured by an imager associated with the furthest focus from the device capturing said image (e.g., the apparatus 200).

As illustrated in FIG. 3, the augmented aimer 306 is well-positioned in alignment with the representation of the machine-readable symbology 304 and the machine-readable symbology 304 is entirely in the frame of the augmented image 300, thereby indicating a preferable alignment of the device utilized to capture the image 302 (e.g., the apparatus 200). The augmented image 300 may be updated as new images are captured, for example via the apparatus 200, such that a new augmented image is created and rendered for each captured image of a particular imager and/or plurality of imagers. In this regard, as a user drifts or otherwise maneuvers the apparatus 200, the augmented aimer 306 may be utilized to determine how to reposition the apparatus 200 to improve the representation of one or more machine readable symbologies, for example the machine-readable symbology 304, within the images captured by the image sensor. For example, in a circumstance where the augmented aimer 306 is depicted in an augmented image above a particular representation of a machine-readable symbology, the user or the system (e.g., the apparatus 200 or an associated device) may determine that the apparatus 200 should be rotated or repositioned downwards to better capture the machine-readable symbology.

It will be appreciated that the data corresponding to the augmented aimer 306 is not to be processed for detecting and decoding particular representations of machine-readable symbologies. In some embodiments the raw data of the captured image 302 is processed during image processing (e.g., to detect and/or decode a machine-readable symbology/machine-readable symbologies represented therein), whereas the augmented image is outputted for rendering via one or more displays. In this regard, the augmented aimer 306 does not prevent successfully completing any such image processing operations, and indeed enables the image processing operations to be performed in parallel with the rendering of the augmented image in some embodiments.

Figure 4:
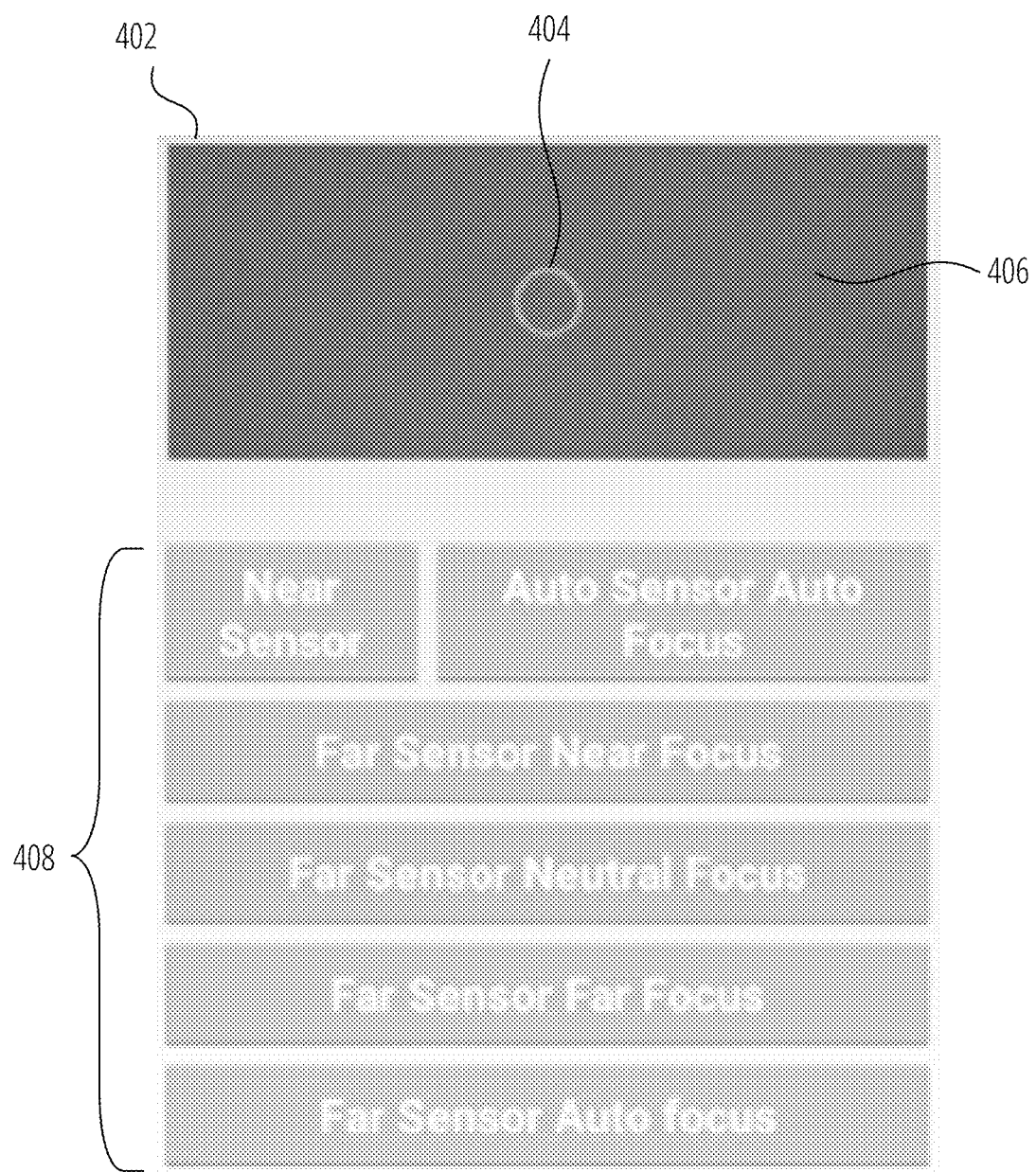
FIG. 4 illustrates a visualization of an example user interface for configuring an augmented aimer in accordance with at least some example embodiments of the present disclosure.

FIG. 4 illustrates a visualization of an example user interface for configuring an augmented aimer in accordance with at least some example embodiments of the present disclosure. Specifically, FIG. 4 depicts an example user interface 402 utilizable to configure an augmented aimer and/or operations for generating an augmented aimer utilizing one more imager(s) of a device. In some embodiments, the apparatus 200 is configured to render the user interface 402 to enable configuration of an augmented aimer rendered by the apparatus 200 and/or imagers of the apparatus 200 utilized to create an augmented image. Alternatively or additionally, in some embodiments, the user interface 402 is rendered by the apparatus 200 to enable configuration of one or more imager(s) of an external device, for example a reader, such as in the context where the apparatus 200 is embodied by a companion device (e.g., a user's smartphone running a specially-configured software application) communicatively coupled with a remote or handheld reader external to the apparatus 200.

In some embodiments, the user interface 402 includes an augmented aimer staging sub-interface 406. The augmented aimer staging sub-interface 406 depicts a preview of an augmented aimer to be generated based on one or more currently set parameter values associated with visually configuring the augmented aimer. For example, as illustrated, the augmented aimer staging sub-interface 406 includes an augmented aimer 404 rendered in the augmented aimer staging sub-interface 406. The augmented aimer 404 may be rendered based on a current value for each visual property indicating a shape or image of the augmented aimer 404, a color, a size, a thickness, and/or the like. In some embodiments, the user interface 402 enables updating of one or more value(s) associated with such visual properties utilized in generating the augmented aimer (e.g., to change from a current value to a new value, thus changing at least one visual characteristic of the augmented aimer 404). In some embodiments, a value for a visual property may be selected from an enumerated group of values (e.g., a preset list of shapes), a continuous value from a range, and/or the like. In some embodiments, as the user interface 402 and/or another interface are utilized to update values for one or more visual properties associated with the augmented aimer, the augmented aimer 404 represented in the user interface 402 is updated to depict the augmented aimer generated based on the updated value(s) for the visual property/visual properties.

In some embodiments, the user interface 402 and/or an associated user interface is utilized to configure one or more imager(s) utilized to capture an image used in generating the augmented image. For example, in some embodiments the user interface 402 and/or an associated user interface is utilized to configure one or more imager(s) utilized to capture an image to be augmented to generate the augmented image rendered via one or more display(s). As illustrated, the user interface 402 includes a plurality of sensor controls 408, for example utilized to select a particular imager for use in capturing an image to be augmented and/or configuring a selected imager. In some embodiments, the user interface 402 is utilized to select and/or otherwise configure at least one imager of an apparatus 200 embodying a specially configured reader utilized to capture such image(s) and output corresponding augmented image(s).

In some embodiments, the sensor controls 408 includes a user interface embodying one or more control(s) associated with selection of a near-field imager or a far-field imager. In this regard, engagement data detected associated with a control corresponding to the near-field imager may configure the apparatus 200, and/or an associated device, to utilize a near-field imager to capture images to be augmented to generate and output corresponding augmented images based on the captured near-field image(s). Additionally or alternatively, in some embodiments, engagement data detected associated with a control corresponding to the far-field imager may configure the apparatus 200, and/or an associated device, to utilize a far-field imager to capture images to be augmented to generate and output corresponding images based on the captured far-field image(s). In this regard, it will be appreciated that the user interface 402 may include at least one control associated with each imager selectable to capture image(s) that may be utilized to generate and output corresponding augmented images. In a dual-imager context, for example, the user interface 402 may be utilized to select between a near-field imager and a far-field imager. In a single imager context, such controls may only exist for the single available imager. In a context with three or more imagers, such controls may exist for each of the plurality of imagers, or a particular subset thereof (e.g., a predetermined or otherwise determinable subset of the imager(s)).

In some embodiments, the sensor controls 408 includes a different control for different configurations of a particular imager. For example, in some embodiments, an imager may be configurable to capture images at different focuses (e.g., corresponding to different focal ranges). The different focuses may be achieved by reconfiguring one or more aspects of the imager, such as a focal range by configuring an image sensor of the imager, repositioning one or more optical component(s) of the imager, and/or the like. In some embodiments, the sensor controls 408 includes a control for selecting between different predetermined focuses for a particular imager, for example a first control for selecting a far sensor with a near focus, a second control for selecting a far sensor with a far focus, and a third control for selecting a far sensor with a neutral focus (e.g., representing a value between the far focus and the near focus). In this regard, a user may engage a particular control to configure the apparatus 200, for example, to utilize a particular desired imager and/or configuration for said imager.

The sensor controls 408 further includes one or more control(s) that automatically determine an imager and/or configuration for a selected imager. For example, in some embodiments, the sensor controls 408 includes a control for automatically selecting a particular imager to be utilized (e.g., without the user being required to explicitly select from an available set of imagers). In this regard, such a sensor control may automatically determine and select an imager for use based at least in part on one or more data-driven determination(s), algorithm(s), and/or the like. In some embodiments, selection of such a control configures the apparatus 200 to attempt use of each available imager, and continue to use the imager that successfully completes a processing operation or otherwise is determined to have the highest likelihood of success of completing such a processing operation.

In some embodiments, the sensor controls 408 includes a control for automatically configuring one or more operational parameters of a selected imager. In one example context, the sensor controls 408 includes at least one control for automatically configuring aa focus of a selected imager. In this regard, the selected imager may be utilized, and the apparatus 200 may utilize a data-driven algorithm to determine a focus that the selected imager is to be set to for subsequent use. In some embodiments, the apparatus 200 attempts use of each configuration (e.g., each focus) and continues to use the configuration that successfully completes a processing operation or otherwise is determined to have the highest likelihood of success completing such a processing operation. It will be appreciated that two or more automatic processes may be combined, for example to make available a control for automatic selection of an imager and automatic configuration of that imager.

The configuration changes initiated via the user interface 402, for example corresponding to use of one or more imager(s) and/or the augmented aimer, may be stored via the apparatus 200 and/or an associated device for use in subsequent operations. For example, once a particular imager is selected and/or configured via the user interface 402, the apparatus 200 may utilize such an imager with such a configuration to capture the images to be augmented and outputted. Additionally or alternatively, one a particular augmented imager (e.g., the augmented aimer 404) is configured, the augmented aimer may be generated and utilized to augment captured images for generating augmented images to be outputted to one or more display(s).

It will be appreciated that the user interface 402 is an exemplary embodiment for configuring various aspects utilized in generating an augmented image. In other embodiments, such aspects (e.g., selected imager, configuration of such an imager, and/or configuration of an augmented aimer) may be updated via any of myriad of other mechanisms. In some other embodiments, alternative user interface(s) may be displayed to a user, for example that includes other user interface control(s) for performing such actions. Alternatively or additionally, in some embodiments, a command line interface is utilized to enable a user to input commands that alter such configurations. Alternatively or additionally still, in some embodiments, the user may utilize physical inputs (e.g., buttons, levers, switches, and/or the like) to alter configuration settings without any such displayed user interface, and where current configuration settings may be indicated by lights, audio signals, and/or other physical indicators. In any such embodiments, such mechanisms may be embodied on a reader itself, a companion device communicable with a reader, both, and/or the like, for example embodied by the apparatus 200. For example, in some embodiments the user utilizes a user interface rendered to a display onboard the apparatus 200 to select configuration settings from a predetermined set of options to configure one or more visual properties of the augmented aimer, imager(s) utilized to capture images to be augmented, and/or the like. As such, the specific user interface depicted and described with respect to FIG. 4 is not to limit the scope and spirit of this disclosure or the claims appended herein.

In some embodiments, the user interface 402 and/or an associated interface is usable to activate use of an augmented aimer at all. For example, in some embodiments a user may configure the apparatus 200 to toggle between a first setting that activates displaying of an augmented image including an augmented aimer (e.g., and disables a physical aimer), and a second setting that activates a physical aimer to generate an aimer illumination via the physical aimer (e.g., and disables use of augmented images). Alternatively or additionally, in some embodiments, the user configures the apparatus 200 to toggle between use of a physical aimer only, and use of a physical aimer and augmented images simultaneously. Alternatively or additionally still, in some embodiments the apparatus 200 automatically configures itself between a first setting that utilizes augmented images (e.g., with or without activating a physical aimer) and a second setting that activates a physical aimer only, as described herein.

Example Processes of the Disclosure

Having described example environments, systems, apparatuses, and user interfaces in accordance with the present disclosure, example processes in accordance with the present disclosure will now be described. It will be appreciated that each of the flowcharts depicts an example computer-implemented process, which is performable in whole or in part by one or more of the apparatuses, systems, devices, and/or computer program products described herein, for example utilizing one or more of the specially configured components thereof. In this regard, the flowcharts each depict a computer-implemented method in addition to a functional description for configuration of the specialized components of such apparatuses, systems, devices, and/or computer program products as described herein.

The blocks depicted indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 5:
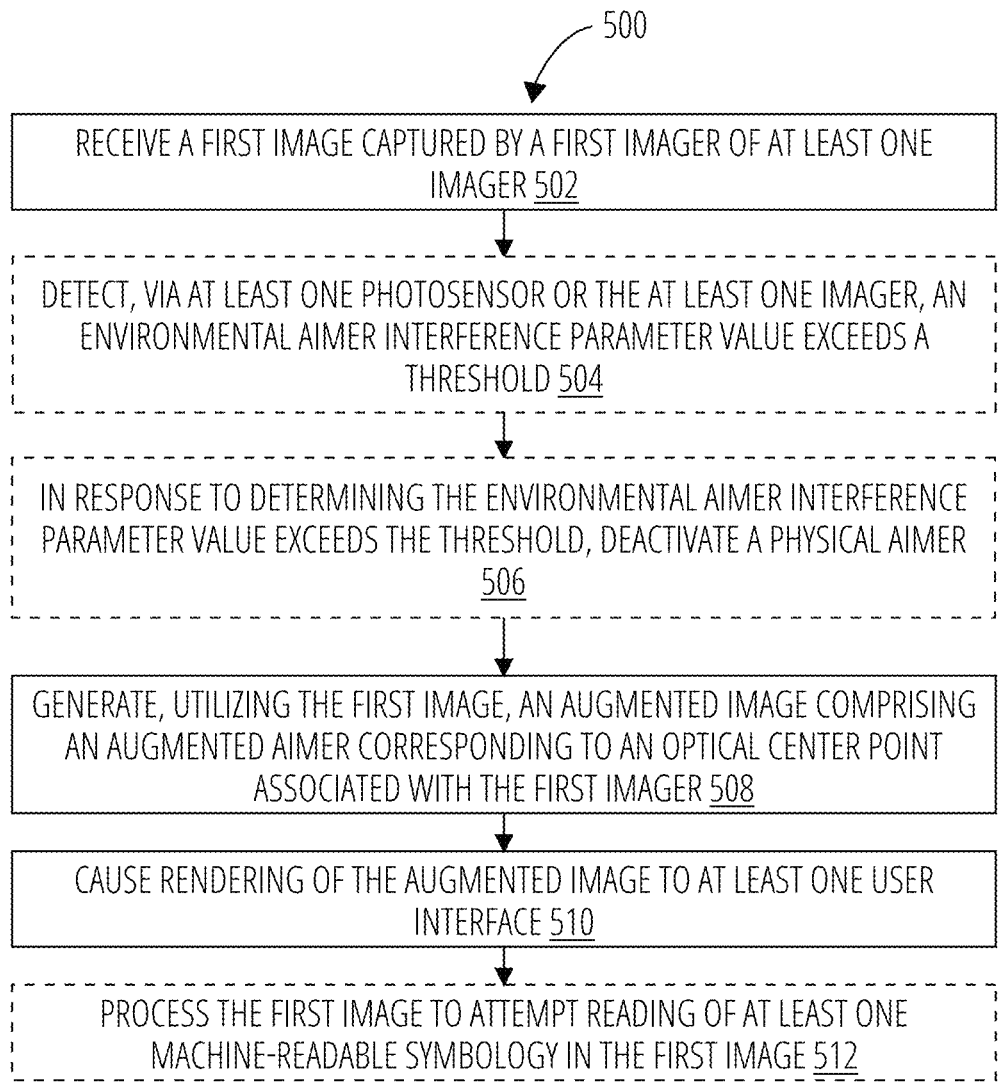
FIG. 5 illustrates operations of an example process for generating and using an augmented aimer in accordance with at least some example embodiments of the present disclosure.

FIG. 5 illustrates operations of an example process for generating and using an augmented aimer in accordance with at least some embodiments of the present disclosure. Specifically, FIG. 5 depicts operations of an example process 500. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a linked, communicable user device and/or external reader. For purposes of simplifying the description, the process 500 is described as performed by and from the perspective of the apparatus 200.

The process 500 beings at operation 502. At operation 502, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that receives a first image captured by a first imager of at least one imager. The first image may represent a captured representation of a field of view associated with the first imager. In some embodiments, the apparatus 200 includes a plurality of imagers that are usable to capture the first image. In other embodiments, the apparatus 200 includes a single imager utilized to capture the first image.

In some embodiments, the apparatus 200 includes the first imager, and captures the first image by activating the first imager. In other embodiments, the apparatus 200 receives the first image via communication with the first imager, and/or a device including the first imager (e.g., an external device including the first imager). In some embodiments, the first imager of the at least one imager is predetermined. In some embodiments, the first imager of the at least one imager is determined based at least in part on user engagement data that manually selects the first imager from the at least one imager. Alternatively or additionally, in some embodiments, the first imager of the at least one imager is selected automatically utilizing one or more data-driven processes.

At optional operation 504, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that detects, via at least one photo-sensor or the at least one imager, an environmental aimer interference parameter value exceeds a threshold. The environmental aimer interference parameter value may correspond to a particular environmental aimer interference parameter that is determined to impact the visibility of an illumination projected by a physical aimer into an environment. Each environmental aimer interference parameter in some embodiments corresponds to a particular threshold representing a value for the corresponding environmental aimer interference parameter that, if satisfied (e.g., exceeded for some parameters, or falls below for other parameters), indicates the visibility of the physical aimer is diminished past an acceptable level.

In some embodiments, the apparatus 200 identifies a predetermined value representing the threshold. In some embodiments, the apparatus 200 determines a value for a particular threshold corresponding to an environmental aimer interference parameter. For example, in some embodiments, the apparatus 200 determines a value for a particular threshold corresponding to an environmental aimer interference parameter based at least in part on captured image data, a current timestamp, an image processing operation to be performed, and/or the like. It will be appreciated that any of a myriad of custom or known algorithm(s) may be utilized to identify a value for a particular threshold.

In some embodiments, the apparatus 200 determines the environmental aimer interference parameter value from captured image data, for example corresponding to the first image. For example, in some embodiments, the apparatus 200 processes the first image to determine the environmental aimer interference parameter value, such as by determining a brightness from the data embodying the first image. It will be appreciated that a value corresponding to any of a myriad of environmental aimer interference parameters utilizing one or more image processing algorithm(s) that process data associated with one or more pixel(s) of the first image.

In some embodiments, the apparatus 200 determines an environmental interference parameter value indicating whether an illumination from physical aimer is visible in a captured image. For example, in some embodiments the apparatus 200 captures an image via one or more imager(s). and processes such image(s) using one or more algorithm(s) for detecting presence of an aimer illumination (e.g., of a particular aimer pattern). The apparatus 200 may set an environmental interference parameter value of true in a circumstance where an aimer illumination is detected, and may set an environmental interference parameter value of false in a circumstance where an aimer illumination is not detected. In a circumstance where the apparatus 200 determines that the aimer illumination from the physical aimer is visible (e.g., based on the environmental interference parameter value set by processing one or more captured image), the apparatus 200 in some embodiments automatically disables or otherwise does not cause rendering of an augmented aimer. In a circumstance where the apparatus 200 determines that the aimer illumination from the physical aimer is not visible (e.g., based on the environmental interference parameter value set by processing one more more captured image), the apparatus 200 in some embodiments automatically enables or otherwise causes rendering of an augmented aimer.

In some embodiments, the apparatus 200 determines an environmental interference parameter value indicating a distance to a subject object (e.g., a target in a particular environment). In some embodiments, the apparatus 200 compares the environmental interference parameter value indicating the distance with a particular threshold that indicates a subject is too far away to utilize a physical aimer. In a circumstance where the apparatus 200 determines that a target object is too far away (e.g., based on the environmental interference parameter value), the apparatus 200 enables or causes rendering of the augmented aimer, and/or in circumstances where the apparatus 200 determines that a target object is not too far away (e.g., based on the environmental interference parameter value), the apparatus 200 disables or does not render the augmented aimer.

In some embodiments, the apparatus 200 determines an environmental interference parameter value indicating a reflectivity parameter of the environment. In some embodiments, the apparatus 200 processes a captured image to determine the environmental interference parameter value representing a reflectivity of the object and/or environment by processing the captured image using one or more image processing algorithms. Algorithm(s) for determining reflectivity based on a captured image may include one or more custom algorithm(s) and/or one or more known algorithm(s) in the art.

In some embodiments, the apparatus 200 includes one or more sensor(s) that derives or otherwise captures an environmental aimer interference parameter value. For example, in some embodiments, the apparatus 200 includes a photosensor that captures the environmental aimer interference parameter value for a particular environmental aimer interference parameter. In some embodiments, a captured value by the sensor of the apparatus 200 embodies the environmental aimer interference parameter value. In other embodiments, the apparatus 200 derives an environmental aimer interference parameter value from the captured value.

At optional operation 506, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that, in response to determining the environmental aimer interference parameter value exceeds the threshold, deactivates a physical aimer.

At operation 508, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that generates, utilizing the first image, an augmented image. In some embodiments, the augmented image includes an augmented aimer. For example, in some embodiments, the apparatus 200 augments the first image to include the augmented aimer, for example such that the augmented image includes the first image as a base image having the augmented aimer superimposed over the base image. In this regard, in some embodiments the apparatus 200 performs an image augmentation algorithm that replaces image data at particular positions with new image data (e.g., representing the augmented aimer) and/or updates the image data to include the augmented aimer at a visible position such that the augmented aimer is rendered on top of the captured image data without replacing or overwriting such data.

In some embodiments, the apparatus 200 generates the augmented aimer for use in the augmented image. The augmented aimer in some embodiments corresponds to an optical center point associated with an imager, for example the first imager. In some embodiments, the augmented aimer is generated based at least in part on configuration data stored to the apparatus 200 associated with configuration of an augmented aimer. For example, in some embodiments, the configuration data includes an aimer size, aimer color, aimer shape and/or image, and/or the like, that the apparatus 200 uses to generate the augmented aimer.

At operation 510, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that causes rendering of the augmented image to at least one user interface. In some embodiments, the apparatus 200 transmits the augmented image to one or more external device(s), system(s), and/or the like for rendering to the at least one user interface. In some embodiments, the apparatus 200 renders the user interface including the augmented image to at least one display of, or communicatively coupled with, the apparatus 200. In some embodiments, the apparatus 200 causes rendering of the user interface including the augmented aimer to a client device associated with the apparatus 200. In some other embodiments, the apparatus 200 renders the user interface to a primary flight display or a multi-function display of a vehicle including the apparatus 200.

At optional operation 512, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that processes the first image to attempt reading of at least one machine-readable symbology in the first image. In some embodiments, the apparatus 200 processes the first image to attempt detection and decoding of a single machine-readable symbology. Alternatively or additionally, in some embodiments, the apparatus 200 processes the first image to attempt detection and/or decoding of any number of machine-readable symbologies. For example, in some embodiments the apparatus 200 processes the first image to detect as many machine-readable symbologies as possible in the first image, and subsequently attempt decoding of each detected machine-readable symbology.

In some embodiments, the apparatus 200 processes the first image utilizing a detection algorithm that detects a particular type of machine-readable symbology, and/or a plurality of types of machine-readable symbology, from image data of the first image. Such detection algorithm(s) may utilize specific markers, patterns, and/or other detectable elements from image data to detect the portions of the first image that correspond to a particular machine-readable symbology. It will be appreciated that the apparatus 200 may utilize any of a myriad of known or custom detection algorithm(s). For example, in some embodiments, the apparatus 200 utilizes a barcode detection algorithm and/or QR code detection algorithm to detect the at least one machine-readable symbology from the image data of the first image. Once detected, the image data portions corresponding to each detected machine-readable symbology may be extracted or otherwise identified for further processing.

In some embodiments, for example, the apparatus 200 decodes the image data of the first image that was detected as corresponding to a particular machine-readable symbology. In some embodiments, the apparatus 200 utilizes one or more decoding algorithm(s) to decode detected machine-readable symbologies of a particular type. In some embodiments the apparatus 200 is configured to utilize a particular pre-determined decoding algorithm to decode machine-readable symbology of a particular type. For example, in one example context, the apparatus 200 utilizes a barcode decoding algorithm and/or QR code decoding algorithm to extract decoded data from the at least one machine-readable symbology detected in the first image. Once data is decoded from a machine-readable symbology of the at least one machine-readable symbology, the apparatus 200 may store such data, transmit the data to another device communicatively coupled with the apparatus 200, and/or otherwise further utilize such decoded data in one or more downstream process(es).

By utilizing the augmented image, a user and/or system may determine an offset from a target subject or other desired point in an environment. For example, in some embodiments a user accessing a device embodied by the apparatus 200 may utilize the position of the augmented aimer as depicted in a rendered augmented image to manipulate the apparatus 200 towards a subject to be captured (e.g., one or more machine-readably symbologies). By utilizing the first image for processing, the augmentation of image data is not detrimental to processing the actual data captured from the environment as represented in the first image.

Figure 6:
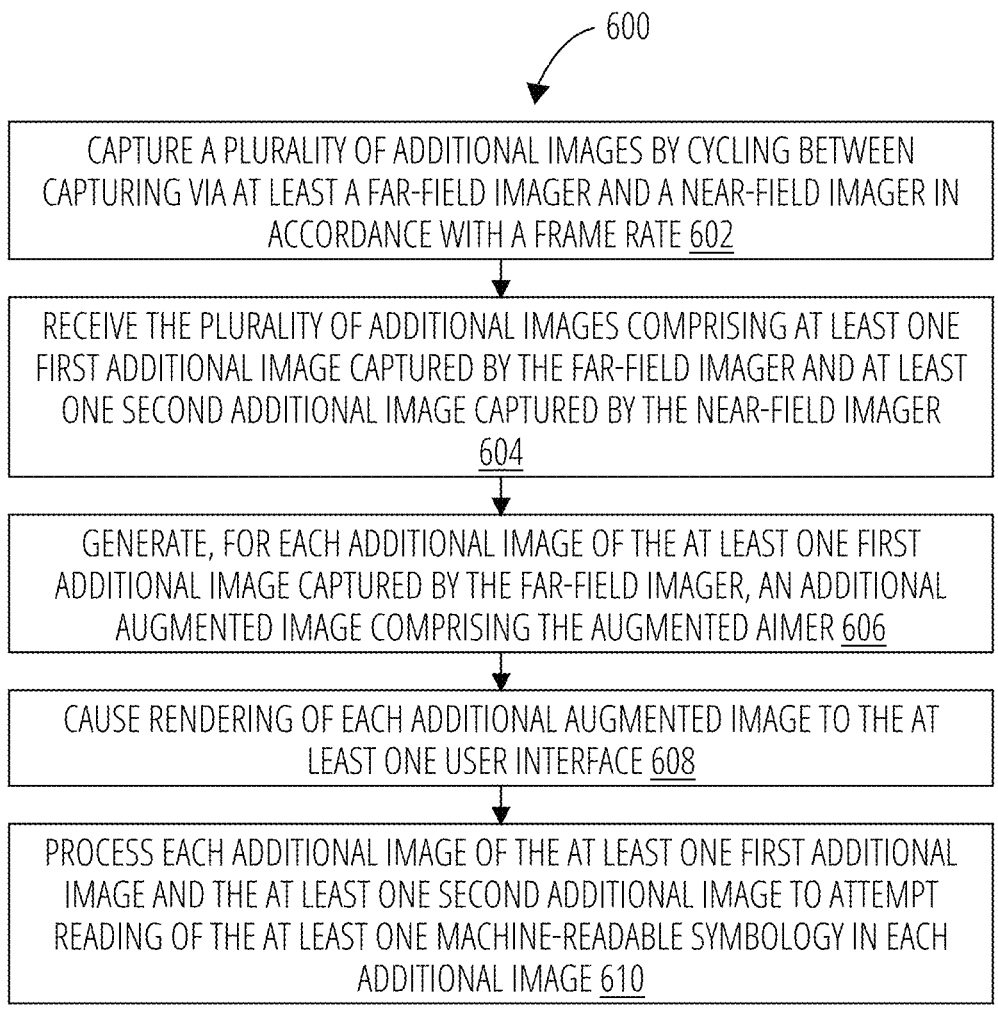
FIG. 6 illustrates operations of an example process for capturing and processing additional images in a multi-imager reader in accordance with at least some embodiments of the present disclosure.

FIG. 6 illustrates operations of an example process for capturing and processing additional images in a multi-imager reader in accordance with at least some embodiments of the present disclosure. Specifically, FIG. 6 depicts operations of an example process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a linked, communicable user device and/or external reader. For purposes of simplifying the description, the process 600 is described as performed by and from the perspective of the apparatus 200.

The process 600 begins at operation 602. In some embodiments, the process 600 begins after one or more operations depicted and/or described with respect to any of the other processes described herein. For example, in some embodiments as depicted, the process 600 begins before execution of operation 502. In this regard, some or all of the process 600 may replace or supplement one or more blocks depicted and/or described with respect to any of the other processes described herein. Upon completion of the process 600, the flow of operations may terminate. Additionally or alternatively, as depicted, upon completion of the process 600, flow may return to one or more operations of another process, such as the operation 502. It should be appreciated that, in some embodiments, the process 600 embodies a sub-process of one or more other process(es), such as the process 500.

At operation 602, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that captures a plurality of additional images by cycling between capturing via at least a far-field imager and a near-field imager in accordance with a frame rate. For example, in some embodiments the apparatus 200 is configured to transmit one or more signal(s) that activate each imager of the at least one imager, such that the activated imager captures and outputs a particular image. In some such embodiments, the apparatus 200 includes a processor and/or other circuitry that facilitates transmission of activation signals at least to a far-field imager associated with a first focus and a near-field imager associated with a second focus, the first focus representing a further distance than the second focus.

In some embodiments, the apparatus 200 identifies a predetermined, user inputted, or programmatically determined frame rate that indicates a rate at which images should be captured via one or more imagers. In some embodiments, the apparatus 200 activates the same imager in accordance with the frame rate, and subsequently activates an alternative imager upon detecting occurrence of one or more trigger condition(s), such as a certain number of captures, a particular timestamp interval, and/or the like. Alternatively or additionally, in some embodiments the apparatus 200 cycles between imagers after each capture. In some embodiments, the apparatus 200 cycles between a near-field imager and a far-field imager to maximize the likelihood that a clear image of a subject (e.g., a machine-readable code) is captured for processing.

At operation 604, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that receives the plurality of additional images comprising at least one first additional image captured by the far-field imager and at least one second additional image captured by the near-field imager. In some embodiments, the additional image is received as output from the far-field imager or the near-field imager. For example, in some embodiments the apparatus 200 receives additional image(s) in accordance with the capture cycle and/or frame rate.

At operation 606, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that generates, for each additional image of the at least one first additional image captured by the far-field imager, an additional augmented image comprising the augmented aimer. Each augmented image may be generated as described with respect to operation 508. In this regard, for example, the apparatus 200 may generate each new additional augmented image upon capture of each new additional image.

At operation 608, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that causes rendering of each additional augmented image to the at least one user interface. In some embodiments, the apparatus 200 causes rendering of each additional augmented image as described in operation 510. In some embodiments, the apparatus 200 renders each new augmented image of the additional augmented images as such a new augmented image is generated. In this regard, the apparatus 200 may update a user interface to include the newly generated augmented image. In one example context, the user interface is updated with each new augmented image to depict changes in the field of view capturable via the apparatus 200 as it is moved, rotated, and/or otherwise manipulated.

At operation 610, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that processes each additional image of the at least one first additional image and the at least one second additional image to attempt reading of the at least one machine-readable symbology in each additional image. In some embodiments, the apparatus 200 processes each additional image as described with respect to operation 512. In this regard, in some embodiments the apparatus 200 continues to process additional images until a machine-readable symbology is successfully processed (e.g., detected and decoded). Alternatively or additionally, in some embodiments, the apparatus 200 continues to process additional images until a second triggering condition is detected. For example, in one example context, the apparatus 200 begins capturing and processing images when a trigger of the apparatus 200 is engaged, and subsequently continues processing such images until the trigger is released. In another example context, the apparatus 200 begins capturing and processing images when a trigger of the apparatus 200 is engaged, and subsequently continues processing such images until a machine-readable symbology is successfully processed.

Figure 7:
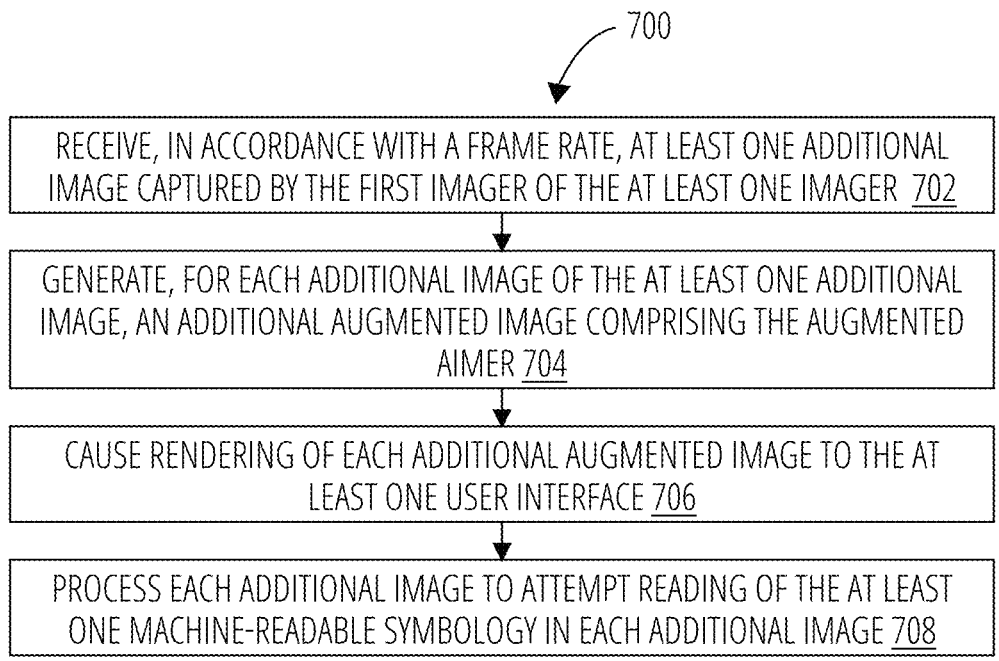
FIG. 7 illustrates operations of an example process for capturing and processing additional images using a far-field imager in accordance with at least some embodiments of the present disclosure.

FIG. 7 illustrates operations of an example process for capturing and processing additional images using a far-field imager in accordance with at least some embodiments of the present disclosure. Specifically, FIG. 7 depicts operations of an example process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a linked, communicable user device and/or external reader. For purposes of simplifying the description, the process 700 is described as performed by and from the perspective of the apparatus 200.

The process 700 begins at operation 702. In some embodiments, the process 700 begins after one or more operations depicted and/or described with respect to any of the other processes described herein. For example, in some embodiments as depicted, the process 700 begins before execution of operation 502. In this regard, some or all of the process 700 may replace or supplement one or more blocks depicted and/or described with respect to any of the other processes described herein. Upon completion of the process 700, the flow of operations may terminate. Additionally or alternatively, as depicted, upon completion of the process 700, flow may return to one or more operations of another process, such as the operation 502. It should be appreciated that, in some embodiments, the process 700 embodies a sub-process of one or more other process(es), such as the process 500.

At operation 702, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that receives, in accordance with a frame rate, at least one additional image captured by the first imager of the at least one imager. In some embodiments, the additional image is received as output from a far-field imager, such that the far-field imager continues to capture images for processing by the apparatus 200. For example, in some embodiments the apparatus 200 receives additional image(s) in accordance with a particular frame rate.

At operation 704, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that generates, for each additional image of the at least one additional image, an additional augmented image comprising the augmented aimer. Each augmented image may be generated as described with respect to operation 508. In this regard, for example, the apparatus 200 may generate each new additional augmented image upon capture of each new additional image from the first imager, such as the far-field imager. In this regard, the far-field imager is utilized to capture additional images for rendering to a user interface, and the far-field imager and/or other imager(s) may be utilized to capture any number of images for attempting to process machine-readable symbologies therein.

At operation 706, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that causes rendering of each additional augmented image to the at least one user interface. In some embodiments, the apparatus 200 causes rendering of each additional augmented image as described in operation 510. In some embodiments, the apparatus 200 renders each new augmented image of the additional augmented images as such a new augmented image is generated based on an additional captured image from the first imager. In this regard, the apparatus 200 may update the user interface to include the newly generated augmented image from the same imager consistently.

At operation 708, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that processes each additional image to attempt reading of the at least one machine-readable symbology in each additional image. In some embodiments, the apparatus 200 processes each additional image as described with respect to operation 512. In this regard, in some embodiments the apparatus 200 continues to process additional images from a particular imager, such as the first imager. In some embodiments the first imager embodies the far field imager, such that the same imager is utilized to capture images for augmentation and processing. In some embodiments, the images are captured until a single machine-readable symbology is successfully read (e.g., detected and decoded). In some embodiments, the images are continuously captured for reading a plurality of machine-readable symbologies.

Figure 8:
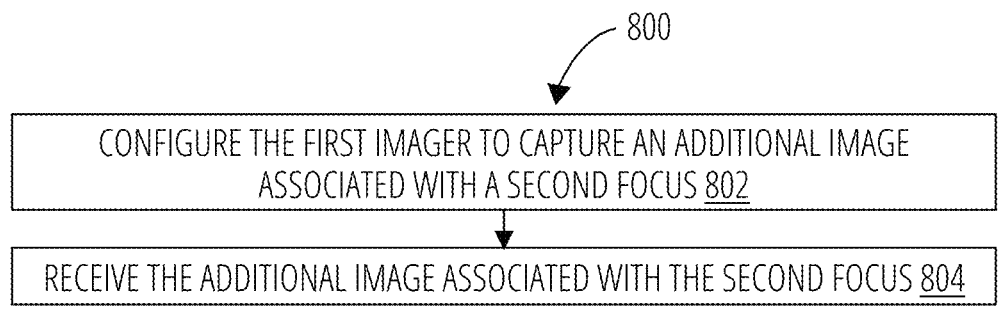
FIG. 8 illustrates operations of an example process for configuring and utilizing an imager associated with an augmented aimer in accordance with at least some embodiments of the present disclosure.

FIG. 8 illustrates operations of an example process for configuring and utilizing an imager associated with an augmented aimer in accordance with at least some embodiments of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a linked, communicable user device and/or external reader. For purposes of simplifying the description, the process 800 is described as performed by and from the perspective of the apparatus 200.

The process 800 begins at operation 802. In some embodiments, the process 800 begins after one or more operations depicted and/or described with respect to any of the other processes described herein. For example, in some embodiments as depicted, the process 800 begins after execution of operation 512. In this regard, some or all of the process 800 may replace or supplement one or more blocks depicted and/or described with respect to any of the other processes described herein. Upon completion of the process 800, the flow of operations may terminate. Additionally or alternatively, as depicted, upon completion of the process 800, flow may return to one or more operations of another process, such as the operation 502. It should be appreciated that, in some embodiments, the process 800 embodies a sub-process of one or more other process(es), such as the process 500.

At operation 802, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that configures the first imager to capture an additional image associated with a second focus. The first imager may be reconfigured from a first focus representing the current focus for the imager. In some embodiments, the apparatus 200 causes the imager to change focus to the second focus by adjusting one or more configurable settings of an image sensor. Alternatively or additionally, in some embodiments, the apparatus 200 causes the imager to change focus to the second focus by otherwise adjusting a focal range associated with the imager. For example, in some embodiments, the apparatus 200 repositions one or more optical components of the imager to cause the change in the focus associated with the imager. In some embodiments, the apparatus 200 generates and/or transmits one or more signal(s) that activate the image sensor and/or other component(s) of the apparatus 200 to cause such reconfiguration.

In some embodiments, the apparatus 200 receives user interaction data indicating the second focus. For example, in some embodiments a user interacts with one or more user interfaces, such as the user interface 402, to select a second focus for which to configure the imager. Alternatively or additionally, in some embodiments, the apparatus 200 automatically determines the second focus for which to configure the imager, for example based at least in part on processing of one or more previously received images.

At operation 804, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that receives an additional image associated with the second focus. In some embodiments, the apparatus 200 receives the additional image from the first imager upon the first imager capturing the additional image. In this regard, the additional image may be focused at a different focus than one or more previously captured images, and thereby may include representation(s) of one or more machine-readable symbologies with different clarity than such previously captured images. Such images at different focuses may have different likelihood of being successfully processed, for example to read machine-readable symbologies represented therein. In this regard, embodiments that receive and process images at a plurality of focuses enable an improved likelihood that one of the captured images will be successfully processed. Additionally or alternatively, in some embodiments, the additional image(s) captured associated with the second focus are additionally or alternatively augmented to generate a new augmented image corresponding to the newly captured additional image. In this regard, the augmented images may similarly be generated and rendered to the user with improved clarity.

Figure 9:
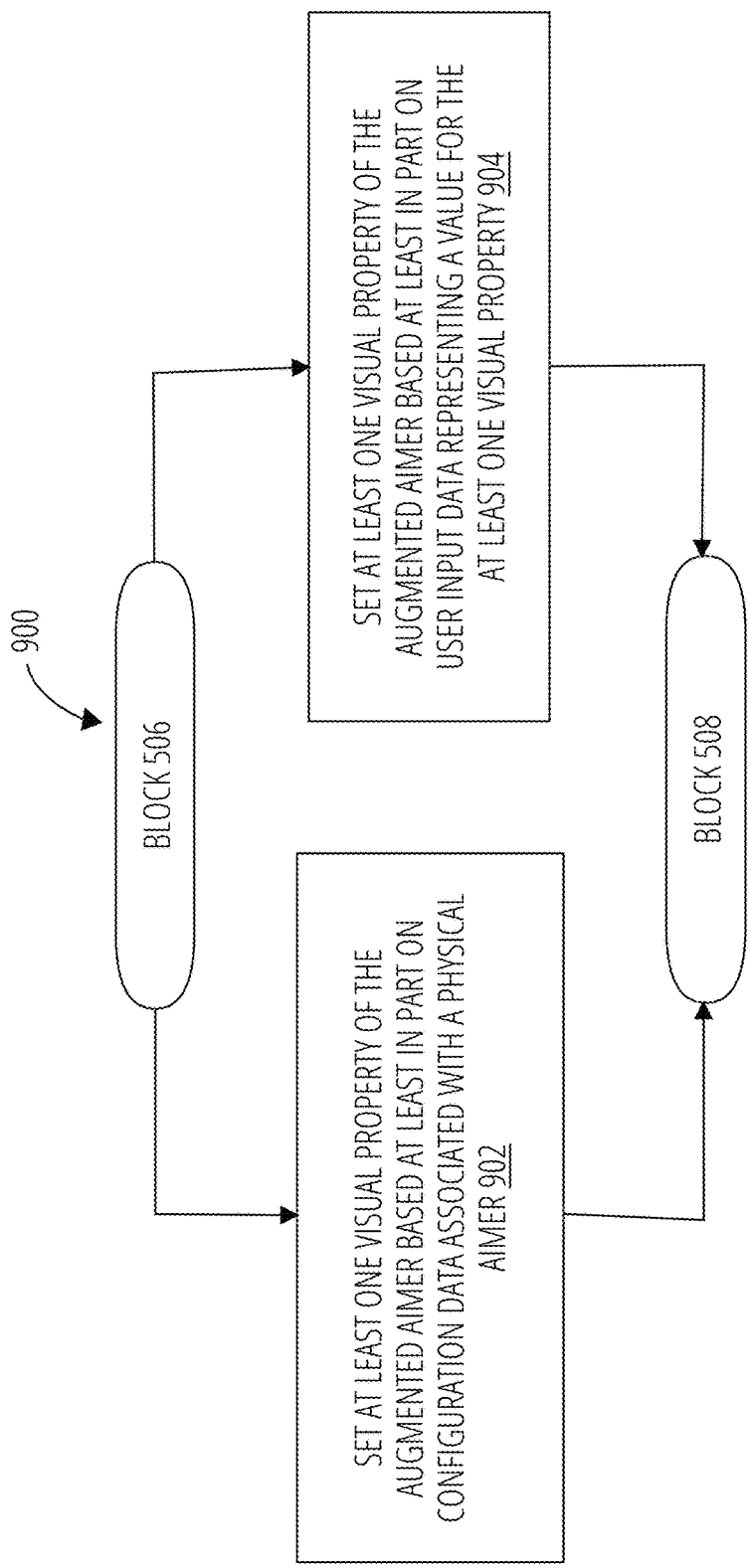
FIG. 9 illustrates operations of an example process for visually configuring an augmented aimer in accordance with at least some example embodiments of the present disclosure.

FIG. 9 illustrates operations of an example process for visually configuring an augmented aimer in accordance with at least some example embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with a linked, communicable user device and/or external reader. For purposes of simplifying the description, the process 900 is described as performed by and from the perspective of the apparatus 200.

The process 900 begins at operation 902 and/or 904. In some embodiments, the process 900 begins after one or more operations depicted and/or described with respect to any of the other processes described herein. For example, in some embodiments as depicted, the process 900 begins after execution of operation 506. In this regard, some or all of the process 900 may replace or supplement one or more blocks depicted and/or described with respect to any of the other processes described herein. Upon completion of the process 900, the flow of operations may terminate. Additionally or alternatively, as depicted, upon completion of the process 900, flow may return to one or more operations of another process, such as the operation 508. It should be appreciated that, in some embodiments, the process 900 embodies a sub-process of one or more other process(es), such as the process 500.

At operation 902, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that sets at least one visual property of the augmented aimer based at least in part on configuration data associated with a physical aimer. In some embodiments, the apparatus 200 determines configuration data indicating one or more visual properties of an illumination projected by the physical aimer. For example, in some embodiments, the apparatus 200 determines configuration data embodying a color of light produced by the physical aimer, a pattern or shape produced by the physical aimer, and/or the like. In some embodiments, the apparatus 200 determines predetermined configuration data, for example stored in a memory of the apparatus 200, from a configuration file accessible to the apparatus 200, and/or the like. Alternatively or additionally, in some embodiments, the apparatus 200 receives such configuration data values from a user, for example where the user inputs such data values. In some embodiments, the apparatus 200 automatically determines one or more data values of the configuration data associated with the physical aimer, for example by transmitting request(s) to the physical aimer or an associated control system (e.g., a processor) for such configuration data and/or portion(s) thereof, and receiving such data in response to the configuration data.

In this regard, the apparatus 200 may set the at least one visual property based on the configuration data such that the visual properties of the augmented aimer match or are similar to the visual properties of the aimer illumination produced via the physical aimer. For example, one or more data values corresponding to visual properties of the augmented aimer may be set based on the configuration data to match a corresponding visual property of the aimer illumination associated with the physical aimer. Accordingly, the augmented image including the newly configured augmented aimer (e.g., based on the configuration data) depicts the augmented aimer in a manner that is visually similar or indistinguishable from the corresponding intended aimer illumination produced via the physical aimer in all contexts.

At operation 904, the apparatus 200 includes means, such as the physical aimer(s) 210, illuminator(s) 212, imager(s) 214, image augmentation circuitry 216, image processing circuitry 218, communications circuitry 208, input/output circuitry 206, processor 202, and/or the like, or a combination thereof, that sets at least one visual property of the augmented aimer based at least in part on user input data representing a value for the at least one visual property. In some embodiments, the user provides user input data by interacting with a particular user interface that enables configuration of one or more visual properties of an augmented aimer, for example as described with respect to the user interface 402. Alternatively or additionally, in some embodiments, the user input data includes one or more command line instructions for configuring a visual property associated with an augmented aimer. Additionally or alternatively still, in some embodiments, the user input data includes one or more physical peripheral or control (e.g., button) inputs that are utilized to cycle through predetermined visual properties for an augmented aimer. In some embodiments, the apparatus 200 receives a plurality of user input data for setting various visual properties associated with an augmented aimer. Subsequent to such visual properties being set, the augmented aimer may be generated and/or included in an augmented image with such visual property configuration(s) set via the user input data. For example, in some contexts a user may set the visual properties for an augmented aimer to preferred visual properties, to match the visual properties of an aimer illumination projected via a physical aimer, and/or the like.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Unless specifically defined herein, terms are used in a generic and descriptive sense only and not for purposes of limitation.

It will be appreciated that various example embodiments are described herein that provide technical advantages and solve technical problems particular to the complex nature of dynamic home communications networks. In other embodiments and contexts, similar advantages are provided to other types of communications networks (e.g., enterprise networks, and/or the like) without deviating from the innovative architectures and operations described throughout. Accordingly, in some embodiments, it will be appreciated that a communications network other than a dynamic home communications network may similarly be monitored and/or otherwise interacted with (e.g., by a malfunction support system) to provide similar advantages with respect to such non-dynamic home communications networks regardless of the reduction in complexity.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server or a connected processing device, or that includes a middleware component, e.g., an application server, or that includes a front-end component, e.g., at least one client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a first image captured by at least one imager;
   determining, from the first image, whether an environmental aimer interference parameter value exceeds a threshold value;
   generating, utilizing the first image, an augmented image comprising an augmented aimer in response to determining that the environmental aimer interference parameter value exceeds the threshold value;
   causing rendering of the augmented image to at least one user interface; and
   processing the first image to attempt reading of at least one machine-readable symbology in the first image.

2. The computer-implemented method of claim 1, wherein the at least one imager comprises a far-field imager having a first focus and a near-field imager having a second focus, wherein the first focus is greater than the second focus.

3. The computer-implemented method of claim 1, the computer-implemented method further comprising:
   capturing the first image via a far-field imager of the at least one imager.

4. The computer-implemented method of claim 1, further comprising:
   capturing a plurality of additional images by cycling between capturing via at least a far-field imager and a near-field imager in accordance with a frame rate;
   receiving the plurality of additional images comprising at least one first additional image captured by the far-field imager and at least one second additional image captured by the near-field imager;
   generating, for each additional image of the at least one first additional image captured by the far-field imager, an additional augmented image comprising the augmented aimer;

causing rendering of each additional augmented image to the at least one user interface; and processing each additional image of the at least one first additional image and the at least one second additional image to attempt reading of the at least one machine-readable symbology in each additional image.

5. The computer-implemented method of claim 1, the computer-implemented method further comprising:

receiving, in accordance with a frame rate, at least one additional image captured by the at least one imager;

generating, for each additional image of the at least one additional image, an additional augmented image comprising the augmented aimer;

causing rendering of each additional augmented image to the at least one user interface; and processing each additional image to attempt reading of the at least one machine-readable symbology in each additional image.

6. The computer-implemented method of claim 5, the computer-implemented method further comprising:

successfully detecting the at least one machine-readable symbology in a final additional image of the at least one additional image.

7. The computer-implemented method of claim 1, wherein the first image is associated with a first focus, the computer-implemented method further comprising:

configuring a second imager of the at least one imager to capture an additional image associated with a second focus;

receiving the additional image associated with the second focus;

generating, utilizing the additional image, an additional augmented image comprising the augmented aimer;

causing rendering of the additional augmented image to the at least one user interface; and processing the additional image to attempt reading of the at least one machine-readable symbology in a first additional image.

8. The computer-implemented method of claim 1, the computer-implemented method further comprising:

detecting, via at least one photosensor or the at least one imager, the environmental aimer interference parameter value to compare with the threshold value; and in response to determining the environmental aimer interference parameter value exceeds the threshold value, deactivating a physical aimer.

9. The computer-implemented method of claim 1, wherein processing the first image to attempt reading of the at least one machine-readable symbology in the first image comprises:

processing the first image beginning from a center pixel associated with the augmented aimer.

10. The computer-implemented method of claim 1, the computer-implemented method further comprising:

setting at least one visual property of the augmented aimer based at least in part on configuration data associated with a physical aimer.

11. The computer-implemented method of claim 1, the computer-implemented method further comprising:

setting at least one visual property of the augmented aimer based at least in part on user input data representing a value for the at least one visual property.

12. The computer-implemented method of claim 1, wherein the augmented aimer is rendered at a center point coordinate positioned at half of a width associated with the first image and half of a height associated with the first image.

13. The computer-implemented method of claim 1, wherein each step is performed on a handheld mobile reader.

14. An apparatus comprising:

at least one imager;

at least one processor; and at least one memory storing instructions that, when executed by the at least one processor, cause the apparatus to:

receive a first image captured by the at least one imager;

determine, from the first image, whether an environmental aimer interference parameter value exceeds a threshold value;

generate, utilizing the first image, an augmented image comprising an augmented aimer in response to determining that the environmental aimer interference parameter value exceeds the threshold value;

cause rendering of the augmented image to at least one user interface; and process the first image to attempt reading of at least one machine-readable symbology in the first image.

15. The apparatus of claim 14, wherein the at least one imager comprises a far-field imager having a first focus and a near-field imager having a second focus, wherein the first focus is greater than the second focus, the apparatus further caused to:

capture a plurality of additional images by cycling between capturing via at least the far-field imager and the near-field imager in accordance with a frame rate;

receive the plurality of additional images comprising at least one first additional image captured by the far-field imager and at least one second additional image captured by the near-field imager;

generate, for each additional image of the at least one first additional image captured by the far-field imager, an additional augmented image comprising the augmented aimer;

cause rendering of each additional augmented image to the at least one user interface; and process each additional image of the at least one first additional image and the at least one second additional image to attempt reading of the at least one machine-readable symbology in each additional image.

16. The apparatus of claim 14, the apparatus further comprising a physical aimer, and the apparatus further caused to:

detect, via at least one photosensor or the at least one imager, the environmental aimer interference parameter value to compare with the threshold value; and in response to determining the environmental aimer interference parameter value exceeds the threshold value, deactivate the physical aimer.

17. The apparatus of claim 14, wherein, to process the first image to attempt reading of the at least one machine-readable symbology in the first image, the apparatus is caused to:

process the first image beginning from a center pixel associated with the augmented aimer.

18. A non-transitory computer-readable storage medium including instructions that, when executed by at least one processor, cause the at least one processor to:

receive a first image captured by at least one imager;

determine, from the first image, whether an environmental aimer interference parameter value exceeds a threshold value;

generate, utilizing the first image, an augmented image comprising an augmented aimer corresponding to an optical center point associated with the at least one imager in response to determining that the environmental aimer interference parameter value exceeds the threshold value;

cause rendering of the augmented image to at least one user interface; and process the first image to attempt reading of at least one machine-readable symbology in the first image.

19. The non-transitory computer-readable storage medium of claim 18, wherein the at least one imager comprises a far-field imager having a first focus and a near-field imager having a second focus, wherein the instructions, when executed by the at least one processor, further cause the at least one processor to:

capture a plurality of additional images by cycling between capturing via at least the far-field imager and the near-field imager in accordance with a frame rate;

receive the plurality of additional images comprising at least one first additional image captured by the far-field imager and at least one second additional image captured by the near-field imager;

generate, for each additional image of the at least one first additional image captured by the far-field imager, an additional augmented image comprising the augmented aimer;

cause rendering of each additional augmented image to the at least one user interface; and process each additional image of the at least one first additional image and the at least one second additional image to attempt reading of the at least one machine-readable symbology in each additional image.

20. The non-transitory computer-readable storage medium of claim 18, wherein the instructions, when executed by the at least one processor, further cause the at least one processor to:

detect, via at least one photosensor or the at least one imager, the environmental aimer interference parameter value to compare with the threshold value; and in response to determining the environmental aimer interference parameter value exceeds the threshold value, deactivate a physical aimer.

* * * * *